US 8,321,392 B2
Nov. 27, 2012

(12) United States Patent
Ireland et al.

(10) Patent No.: US 8,321,392 B2
(45) Date of Patent: Nov. 27, 2012

(54) PENDING STATE MANAGEMENT FOR MOBILE BUSINESS OBJECTS

(75) Inventors: Evan Ireland, Wellington (NZ); David Clegg, Altadena, CA (US); Michael Ho, Danville, CA (US); Hemal Pandya, Pune (IN); Guo-ping Zhang, Beijing (IN)

(73) Assignee: Sybase, Inc., Dublin, CA (US)

( * ) Notice: Subject to any disclaimer, the term of this patent is extended or adjusted under 35 U.S.C. 154(b) by 162 days.

(21) Appl. No.: 12/797,975

(22) Filed: Jun. 10, 2010

(65) Prior Publication Data
US 2011/0161339 A1 Jun. 30, 2011

Related U.S. Application Data

(60) Provisional application No. 61/290,993, filed on Dec. 30, 2009.

(51) Int. Cl.
*G06F 17/00* (2006.01)
(52) U.S. Cl. ........ 707/704; 707/706; 707/711; 707/728; 707/791; 707/795
(58) Field of Classification Search .................. 707/704, 707/706, 711, 728, 791, 795
See application file for complete search history.

(56) References Cited

U.S. PATENT DOCUMENTS

| | | | |
|---|---|---|---|
| 6,381,241 B1 | 4/2002 | Ghirnikar et al. | |
| 6,983,293 B2 | 1/2006 | Wang | |
| 7,853,561 B2 * | 12/2010 | Holenstein et al. | 707/611 |
| 7,882,062 B2 * | 2/2011 | Holenstein et al. | 707/610 |
| 7,962,458 B2 * | 6/2011 | Holenstein et al. | 707/704 |
| 8,037,056 B2 * | 10/2011 | Naicken et al. | 707/711 |
| 8,086,661 B2 * | 12/2011 | Holenstein et al. | 709/201 |
| 2004/0205770 A1 | 10/2004 | Zhang et al. | |
| 2005/0021354 A1 | 1/2005 | Brendle et al. | |
| 2005/0055465 A1 | 3/2005 | Sato | |
| 2005/0055698 A1 | 3/2005 | Sasaki et al. | |
| 2005/0268032 A1 | 12/2005 | Sikdar et al. | |
| 2006/0112398 A1 | 5/2006 | Mukkamala et al. | |
| 2006/0123010 A1 | 6/2006 | Landry et al. | |
| 2007/0099640 A1 | 5/2007 | Khushu et al. | |
| 2007/0100834 A1 | 5/2007 | Landry et al. | |
| 2007/0260475 A1 | 11/2007 | Bhanote | |
| 2008/0155525 A1 | 6/2008 | Ho | |
| 2008/0176536 A1 | 7/2008 | Galluzzo et al. | |

(Continued)

FOREIGN PATENT DOCUMENTS

KR 10-2003-0072693 A 9/2003

(Continued)

OTHER PUBLICATIONS

Linthicum, David S., "Chapter 20: EAI Moving Forward," In *Enterprise Application Integration*, Addison-Wesley, XP000002659187, ISBN: 0-201-61583-5, pp. 339-349, May 1, 2000.

(Continued)

*Primary Examiner* — Sana Al Hashemi
(74) *Attorney, Agent, or Firm* — Sterne, Kessler, Goldstein & Fox PLLC

(57) ABSTRACT

A system, method, and computer program product are provided for invoking an operation to change a current data row of a table in a local database. As a result, a pending change data row is inserted in the table, distinguished by a primary key comprising a common key value and a pending change indicator. The pending change is then submitted for synchronization.

29 Claims, 14 Drawing Sheets

U.S. PATENT DOCUMENTS

| | | | |
|---|---|---|---|
| 2009/0037430 | A1 | 2/2009 | Mukkamala et al. |
| 2009/0177800 | A1 | 7/2009 | Gidron et al. |
| 2009/0187622 | A1 | 7/2009 | Xie |
| 2009/0198772 | A1 | 8/2009 | Kim et al. |
| 2009/0222402 | A1 | 9/2009 | Tysowski |
| 2010/0030783 | A1 | 2/2010 | Ho et al. |
| 2011/0161349 | A1 | 6/2011 | Ireland et al. |
| 2011/0161383 | A1 | 6/2011 | Ho et al. |

FOREIGN PATENT DOCUMENTS

| | | |
|---|---|---|
| KR | 10-2006-0060629 A | 6/2006 |
| KR | 10-2011-0074059 A | 6/2011 |

OTHER PUBLICATIONS

Linthicum, David S., "Chapter 11: Database-Oriented Middleware and EAI", In *Enterprise Application Integration*, Addison-Wesley, XP002579155, ISBN: 978-0-201-61583-8, May 1, 2000.

Extended European Search Report, dated Sep. 27, 2011, for European Patent Appl. No. 09803252.7, 7 pages.

Notification of Transmittal of the International Search Report and Written Opinion, dated Mar. 18, 2010, for PCT Appl. No. PCT/US2009/004343, 11 pages.

Notification of Transmittal of the International Search Report and Written Opinion, dated Jul. 28, 2011, for PCT Appl. No. PCT/US2010/060290, 10 pages.

Notification of Transmittal of the International Search Report and Written Opinion, dated Aug. 2, 2011, for PCT Appl. No. PCT/US2010/060293, 11 pages.

Notification of Transmittal of the International Search Report and Written Opinion, dated Aug. 5, 2011, for PCT Appl. No. PCT/US2010/060296, 9 pages.

English Abstract for Korean Patent Pub. No. 10-2003-0072693 A, published Sep. 19, 2003, 1 page, from http://worldwide.espacenet.com.

English Abstract for Korean Patent Pub. No. 1-2006-0060629 A, published Jun. 5, 2006, 1 page, from http://worldwide.espacenet.com.

English Abstract for Korean Patent Pub. No. 10-2011-0074059 A, published Jun. 30, 2011, 1 page, from http://worldwide.espacenet.com.

Sinitsyn, A. "A Synchronization Framework for Personal Mobile Servers," *Second IEEE Annual Conference of Pervasive and Communications, Includes Workshop Papers*, Orlando, Florida, pp. 1-5, Mar. 14-17, 2004.

Office Communication, dated Sep. 19, 2011, for U.S. Appl. No. 12/503,573, filed Jul. 15, 2009, 12 pages.

\* cited by examiner

PENDING STATE MANAGEMENT FOR MOBILE BUSINESS OBJECTS

CROSS-REFERENCE TO RELATED APPLICATIONS

The present application claims the benefit of U.S. provisional application No. 61/290,993, filed on Dec. 30, 2009, and is related to co-pending U.S. patent application Ser. No. 12/649,527, filed on Dec. 30, 2009 and entitled "Message Based Mobile Object with Native PIM Integration" and U.S. patent application Ser. No. 61/290,990, filed on Dec. 30, 2009 and entitled "Message Based Synchronization for Mobile Business Objects" which are incorporated herein by reference in their entireties.

BACKGROUND OF INVENTION

1. Field of the Invention

The present invention relates generally to database synchronization, and, more specifically, to communication methodologies for data synchronization.

2. Description of the Background Art

Mobile devices have traditionally relied on synchronizing with enterprise systems whenever connectivity is available by performing a complete synchronization event, usually at a user-specified opportunity. For example, a mobile device may have connectivity when placed in a docking cradle. The mobile device performs a complete synchronization of its data, both upload and download, upon docking.

However, these traditional methods do not provide sufficient information to resolve conflicts where, for example, the data relied upon by a device when updating information is outdated, or when another mobile device has performed an update during the same disconnected time period. Moreover, traditional methods do not include communication methodologies which enable mobile devices to reliably send and receive these updates.

Accordingly, what is desired are improved methods for synchronization of data from mobile devices with enterprise systems.

SUMMARY OF INVENTION

Embodiments of the invention include a method comprising invoking an operation to change a current data row from a table in a local database, inserting a pending change data row in the table, the pending change data row comprising a changed attribute, wherein the pending change data row and current data row are distinguished by a primary key comprising a key value which is common to the pending change data row and the current data row and a pending change indicator, and submitting data from the pending change data row.

Embodiments of the invention additionally include a computer-readable medium having computer-executable instructions stored thereon that, if executed by a computing device, cause the computing device to perform a method comprising invoking an operation to change a current data row from a table in a local database, inserting a pending change data row in the table, the pending change data row comprising a changed attribute, wherein the pending change data row and current data row are distinguished by a primary key comprising a key value which is common to the pending change data row and the current data row and a pending change indicator, and submitting data from the pending change data row.

Embodiments of the invention further include a system comprising a memory configured to store modules comprising an invoking module configured to invoke an operation to change a current data row from a table in a local database, an inserting module configured to insert a pending change data row in the table, the pending change data row comprising a changed attribute, wherein the pending change data row and current data row are distinguished by a primary key comprising a key value which is common to the pending change data row and the current data row and a pending change indicator, and a submitting module configured to submit data from the pending change data row, and one or more processors configured to process the modules.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form a part of the specification, illustrate embodiments of the present invention and, together with the description, further serve to explain the principles of the invention and to enable a person skilled in the relevant art to make and use the invention.

Figure 1:
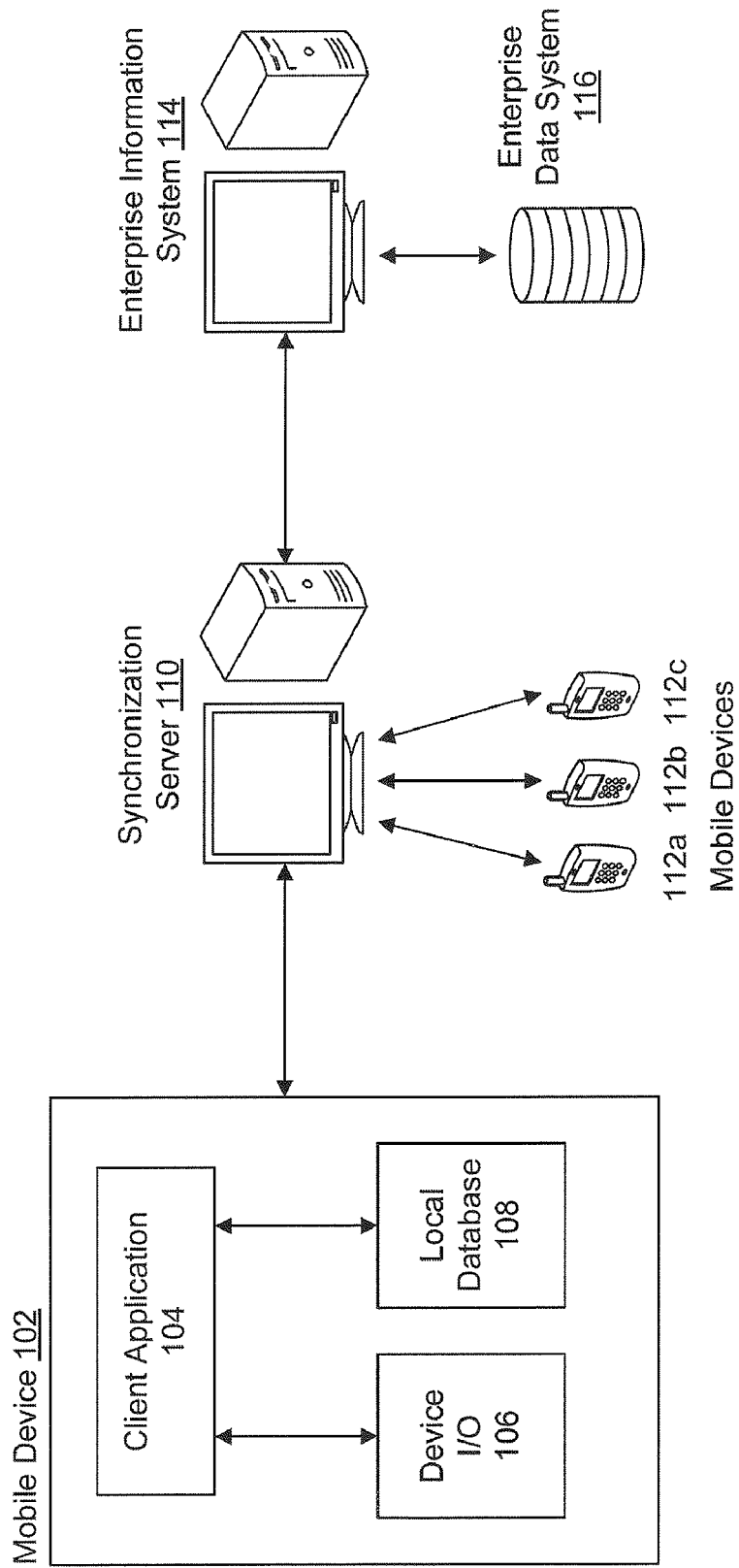
FIG. 1 is an exemplary enterprise network, in accordance with an embodiment of the present invention.

The present invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

I. Introduction

The following detailed description of the present invention refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

It would be apparent to one of skill in the art that the present invention, as described below, can be implemented in many different embodiments of software, hardware, firmware, and/or the entities illustrated in the figures. Any actual software code with the specialized control of hardware to implement the present invention is not limiting of the present invention. Thus, the operational behavior of the present invention will be described with the understanding that modifications and variations of the embodiments are possible, and within the scope and spirit of the present invention.

FIG. 1 is an exemplary enterprise network 100, in accordance with an embodiment of the present invention. The enterprise network 100 includes a mobile device 102, in accordance with a further embodiment of the present invention. Mobile device 102 may include, by way of example and not limitation, mobile devices such as the BLACKBERRY by RESEARCH IN MOTION of Waterloo, Ontario, Canada or the APPLE IPHONE by APPLE COMPUTER, INC. of Cupertino, California. One skilled in the relevant arts will recognize that techniques described herein as applicable to mobile device 102 may also generally be applied to non-mobile devices as well, such as, for example, a personal computer.

In accordance with an embodiment of the present invention, mobile device 102 has a client application 104 installed thereon. Client application 104 is able to interface with device inputs and outputs ("I/O") 106, such as, for example, a monitor, keypad, or touchscreen display, in accordance with an embodiment of the present invention. Client application 104 is also able to interface with a local database 108, which stores a set of data intended for use by client application 104.

Mobile device 102 is in communication with synchronization server 110, in accordance with an embodiment of the present invention. Additional mobile devices 112a-c are similarly in communication with synchronization server 110, in accordance with a further embodiment of the present invention. The various mobile devices can be connected to synchronization server 110 via any one or more communications channels, as would be understood by one skilled in the relevant art. For example, connectivity between mobile device 102 and synchronization server 110 may involve, in an exemplary embodiment, communication hops over both a cellular communication network and the Internet. The various communication hops may themselves be either public or private networks, and may include components located on the Internet as well as various private intranets.

Synchronization server 110 sits between the one or more mobile devices 102 and 112a-c and an Enterprise Information System ("EIS") 114, in accordance with an embodiment of the present invention. Synchronization server 110 assists in capturing changes to relevant data made by the EIS 114 and providing the changes to mobile devices 102 and 112a-c. Synchronization server 110 also assists in capturing changes made by the mobile devices 102 and 112a-c and providing the changes to EIS 114. In this manner, data available to a mobile device 102 in local database 108 can be synchronized with data from the corresponding data store of EIS 114, the enterprise data system 116. In accordance with an embodiment of the present invention, synchronization server 110 maintains a cache reflecting the data from enterprise data system 116.

EIS 114 is connected to synchronization server 110 in order to allow synchronization server 110 to provide the aforementioned data synchronization services, in accordance with an embodiment of the present invention. Communications between EIS 114 and synchronization server 110 can likewise be through any communication channels, as would be understood by one skilled in the relevant art. One skilled in the relevant arts will further understand that EIS 114 and synchronization server 110 may share a same physical server or distributed server as separate software components therein, or may even be compiled as a single combined application. Therefore, it is understood that synchronization server 110 and EIS 114 may be disposed in a number of different locations within enterprise network 100, and are shown as separate computing devices in FIG. 1 by way of example, and not limitation.

As previously noted, EIS 114 further includes, or is otherwise communicatively coupled to, an enterprise system 116, in accordance with an embodiment of the present invention. In accordance with a further embodiment of the present invention, data within local database 108 comprises a subset of data from enterprise data system 116. This data may be in for the form of a mobile business object ("MBO"), in accordance with an embodiment of the present invention. An MBO is a business object that can be synchronized between enterprise information system 114 and mobile device 102. The MBO can be persisted, by storage in local database 108, in order to allow for access by the mobile device 102 during periods without connectivity to EIS 114. A non-limiting example of MBOs is provided in U.S. patent application Ser. No. 12/503,573, filed on Jul. 15, 2009, entitled "Metadata Driven Mobile Business Objects," which is incorporated by reference herein in its entirety.

Communications between client application 104 and synchronization server 110 may be handled in a number of different ways, as will be recognized by one skilled in the relevant art. In accordance with an embodiment of the present invention, a communications framework is embedded directly within client application 104 as provided by a code generator or by a developer. In accordance with an additional embodiment of the present invention, a helper application may be deployed on mobile device 102 to manage the communications.

II. Exemplary Business Object Models

In accordance with an embodiment of the present invention, MBOs can be modeled using a publicly available XML based domain-specific language called Applications From XML ("AFX"). One skilled in the relevant arts will recognize that MBOs can be modeled in many different ways, including graphically through the use of visual modeling tools, or textually through the use of domain-specific languages such as AFX. Accordingly, examples presented and discussed herein through the use of AFX are provided by way of example, and not limitation.

A package definition provides a database definition, defining the name of a local database 108 within mobile device 102, a database-class definition, and zero or more entity definitions, in accordance with an embodiment of the present invention. The database-class definition identifies a class that represents the local database 108. Entity definitions, if present, each correspond to an MBO. The entity definition in turn defines the name of a class that represents the corresponding MBO.

Entities are themselves stored within local database 108, in accordance with an embodiment of the present invention. In accordance with a further embodiment of the present invention, entities are keyed using at least a surrogate key and an alternate key. The surrogate key is a key value used by the mobile device 102 to account for the mobile device's inability to access the EIS' 114 key creation process. If the client becomes aware of the EIS 114 key for the entity, this key can be used as an alternate key. In accordance with a further embodiment of the present invention, surrogate keys are provided by synchronization server 110 to mobile device 102 as a batch of keys to be assigned as needed.

In accordance with a further embodiment of the present invention, entity definitions include operation definitions for corresponding changes within EIS 114. By way of example, and not limitation, operation definitions are provided for creating, updating, or deleting data within EIS 114. Entity definitions may also provide named queries, which are predefined queries that can be issued by mobile device 102 against local database 108, in accordance with an embodiment of the present invention. In accordance with further embodiments of the present invention, entity definitions may also include definitions indicating that changes made by mobile device 102 can be published to synchronization server 110, and likewise that changes made by EIS 114 are subscribed to for download to mobile device 102.

A non-limiting example object model incorporating the aforementioned elements may therefore read:

```
<package name="com.example.bank">
    <database name="my-bank" />
    <database-class name="MyDatabase" />
    <entity name="Account" key="surrogateKey" alternate-key="accountId">
        <attribute name="surrogateKey" type="int" generated="true" />
        <attribute name="accountId" type="string" />
        <attribute name="customerId" type="string" />
        <attribute name="balance" type="decimal" />
        <operation name="create">
            <!-- information describing the EIS operation -->
        </operation>
        <operation name="update">
            <!-- information describing the EIS operation -->
        </operation>
        <operation name="delete">
            <!-- information describing the EIS operation -->
        </operation>
        <query name="findByCustomer" type="Account*">
            <parameter name="id" type="string" />
            <sql>
```

```
            select a.* from Account a where a.customerId = :id
            </sql>
        </query>
        <publish />
        <subscribe />
    </entity>
</package>
```

In the above exemplary object model, a package "com.example.bank" associated with local database 108 "my-bank" represented by class "MyDatabase" contains a single entity named "Account". This entity is keyed by a surrogate key, with an alternate key defined by the account ID, which in this instance is the actual unique key used by the backend systems of EIS 114.

The Account entity also has several attributes, including the aforementioned surrogate key and account ID, but also a customer ID corresponding to the account and the balance of the account, in accordance with an embodiment of the present invention. The Account entity also defines a query "findByCustomer" that allows for a particular Account with the corresponding customer ID to be located and used in an instance of the MBO.

Additionally, the Account entity defines several operations describing EIS 114 operations for creating, updating, and deleting data corresponding to an entity from within enterprise data system 116, in accordance with an embodiment of the present invention.

In accordance with an embodiment of the present invention, a code generator is run on the package definition in order to generate code for inclusion in client application 104. This allows a developer of client application 104 to rapidly enable the client application 104 to coordinate the downloading and uploading of changes between mobile device 102 and synchronization server 110. In accordance with a further embodiment of the present invention the code generator can also generate code for execution on the synchronization server 110.

Based on the above exemplary package definition, it is possible to code client application 104 to utilize generated code derived by the code generator from the package definition to perform certain functions. For example, code generated from the above package generation can be called to resolve the following code sample from client application 104:

```
var accounts = Account.findByCustomer("123");
for (var a in accounts)
{
    print("Account: " + a.accountId + ", balance: " + a.balance);
}
```

This code utilizes calls to classes automatically generated by the code generator, in accordance with an embodiment of the present invention. For example, the segment Account.findByCustomer("123") utilizes the named query "findByCustomer" in order to return matching accounts into the "accounts" variable. Then, for each result "a" in "accounts", the corresponding account ID and balance can be displayed.

Rather than using the named query findByCustomer, an end-user may specify selection criteria in a dynamic query, in accordance with an embodiment of the present invention. A code generator may specify several options for a developer to choose from in defining the necessary query. For example, the following example code can be customized by a developer to search for accounts matching specific attributes:

```
var attribute = ... // ask the user for an attribute name
var testValue = ... // ask the user for a comparison value
var query = new Query( );
query.where(AttributeTest.equal(attribute, testValue));
var accounts = Account.findWithQuery(query);
for (var a in accounts)
{
    print("Account: " + a.accountId + ", balance: " + a.balance);
}
```

In accordance with an embodiment of the present invention, a drop-down menu or other input interface functionality may be provided to the developer in order to customize the attribute and test value used in the above example.

In the above examples, each account represents an instance of a MBO. As previously noted, and as shown in the exemplary object model, MBOs may support functions that enable the specification of changes to EIS 114, in accordance with an embodiment of the present invention. These changes are, in an exemplary embodiment, create, update, or delete operations performed on an MBO. Continuing with the above example account entity, and not by limitation, an account balance can be updated with the code:

```
var account = ... // look up an account (e.g., using a query)
var deposit = ... // specify a deposit amount
account.balance = account.balance + deposit;
account.update( );
```

This exemplary code segment selects an account for modification, determines a deposit amount, and applies it to the account balance. When the change is ready to be applied, the account.update( ) method is called, in accordance with an embodiment of the present invention. Similarly, if a new account was created, the account.create( ) method would be called to commit the account to local database 108. The account.delete( ) method would delete the account from local database 108. These modifications are all stored within local database 108 as pending changes, in accordance with an embodiment of the present invention. In accordance with a further embodiment of the present invention, local database 108 retains a copy of the original state prior to modification. This allows reversion of the local database 108, if desired, in the event that a replay of the data by EIS 114 against enterprise data system 116 fails for any reason.

When client application 104 is ready to submit the pending change to synchronization server 110 for synchronization to EIS 114, the submitPending( ) method is called (e.g., account.submitPending( )) in order to queue the pending change for delivery, in accordance with an embodiment of the present invention. In accordance with a further embodiment of the present invention, the pending change is delivered in a message, as will be described in detail below.

In accordance with a further embodiment of the present invention, a message sent to synchronization server 110 containing the pending change also includes the original state. By submitting the pending state and original state, the EIS 114 is able to avoid, detect, or resolve many conflicts. Continuing with the previous exemplary entities, balances for a same account may be updated by two mobile devices without knowledge of the other's update, such that the original basis for the change is inconsistent amount the devices. For example, in chronological order:

Device 1 downloads a balance of 100 for account 123.
Device 2 downloads a balance of 100 for account 123.
Device 1 updates the balance to 200, but does not immediately call account.submitPending( )
Device 2 updates the balance to 150, and does call account.submitPending( )
EIS receives the update request from device 2, and updates the current balance to 150 at the enterprise data system.
Device 1 now calls account.submitPending, indicating an original state balance of 100 and a pending change of 200.
EIS compares the original state balance of 100 and its own reported current balance of 150, based on the applied update from device 2. Recognizing the mismatch, EIS can apply the difference of the received pending balance and the original state balance (e.g., 200-100) to the current balance of 150.
Both devices 1 and 2 synchronize to the new balance of 250.

In the event that the EIS 114 is unable to resolve a conflict, or if EIS 114 wants to allow the mobile device 102 to resolve the conflict, EIS 114 can provide client application 104 with a notification of the failure, in accordance with an embodiment of the present invention. In accordance with a further embodiment of the present invention, EIS 114 can also provide client 104 with a notification of a successful replay operation.

Figure 2A:
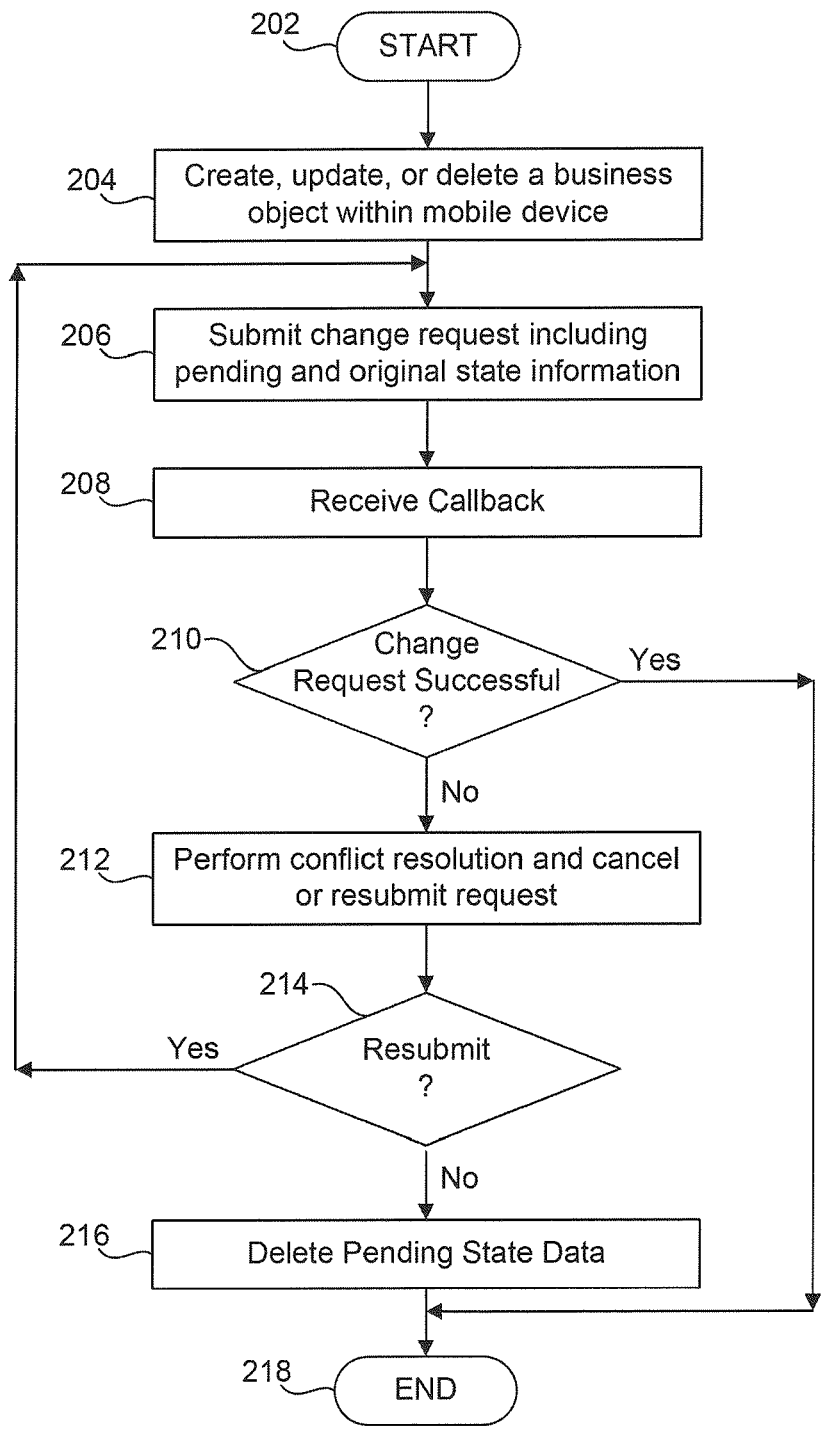
FIG. 2A is a flowchart illustrating steps by which a client application of a mobile device is operable to submit a create, update, or delete message for a business object to a synchronization server for delivery to an enterprise information system, in accordance with an embodiment of the present invention.

FIG. 2A is a flowchart 200 illustrating steps by which a client application 104 of mobile device 102 is operable to submit a create, update, or delete ("CUD") message for a business object to synchronization server 110 for delivery to EIS 114, in accordance with an embodiment of the present invention. The method begins at step 202 and proceeds to step 204 where a creation, update, or deletion of an MBO takes place. At step 206, the CUD message is submitted to synchronization server 110, the message including both the pending change and the original state, in accordance with an embodiment of the present invention.

At step 208, client application 104 receives a callback, in accordance with an embodiment of the present invention. In accordance with a further embodiment of the present invention, this callback may indicate either a success or failure of the EIS' 114 attempt to replay the CUD message against enterprise data system 116. In accordance with an embodiment of the present invention, a portion of client application 104 generated by a code generator is responsible for receipt of the notifications and to callback registered functions responsive to the notifications. In accordance with a further embodiment of the present invention, an additional portion of client application 104 registers a callback handler to receive a callback when a notification is received. Step 210 depicts this determination as to whether the replay was successful. If the replay was successful, then the method ends at step 218.

On the other hand, if the replay was unsuccessful, a conflict resolution process is performed at step 212, in accordance with an embodiment of the present invention. In the aforementioned example where two devices sent conflicting balance updates, the EIS 114 chose to resolve the discrepancy by applying the difference in the second balance update to reflect an amount being added to the account. One skilled in the relevant arts will appreciate the different ways in which conflicts will need to be resolved in different conflict scenarios, and this exemplary conflict resolution process may not be appropriate in all circumstances. Accordingly, the appropriate flexibility is provided herein to allow a developer to properly handle conflicts.

For example, rather than attempting to resolve the balance based on the data received from device 1 in the above example, EIS 114 may have instead refused to apply the update received second and issued a notification to device 1 indicating failure of the update. As in step 212, client application 104 is aware of this replay failure by EIS 114, and can apply its own conflict resolution, if desired.

In accordance with an embodiment of the present invention, a decision is made as to whether to resubmit the CUD message at step 214. If the message is to be resubmitted, any necessary changes to correct for the conflict are made and the message resubmitted at step 206. Otherwise, the modification is cancelled by deleting the pending state data from local database 108 at step 216, in accordance with a further embodiment of the present invention. The method then ends at step 218.

Figure 2B:
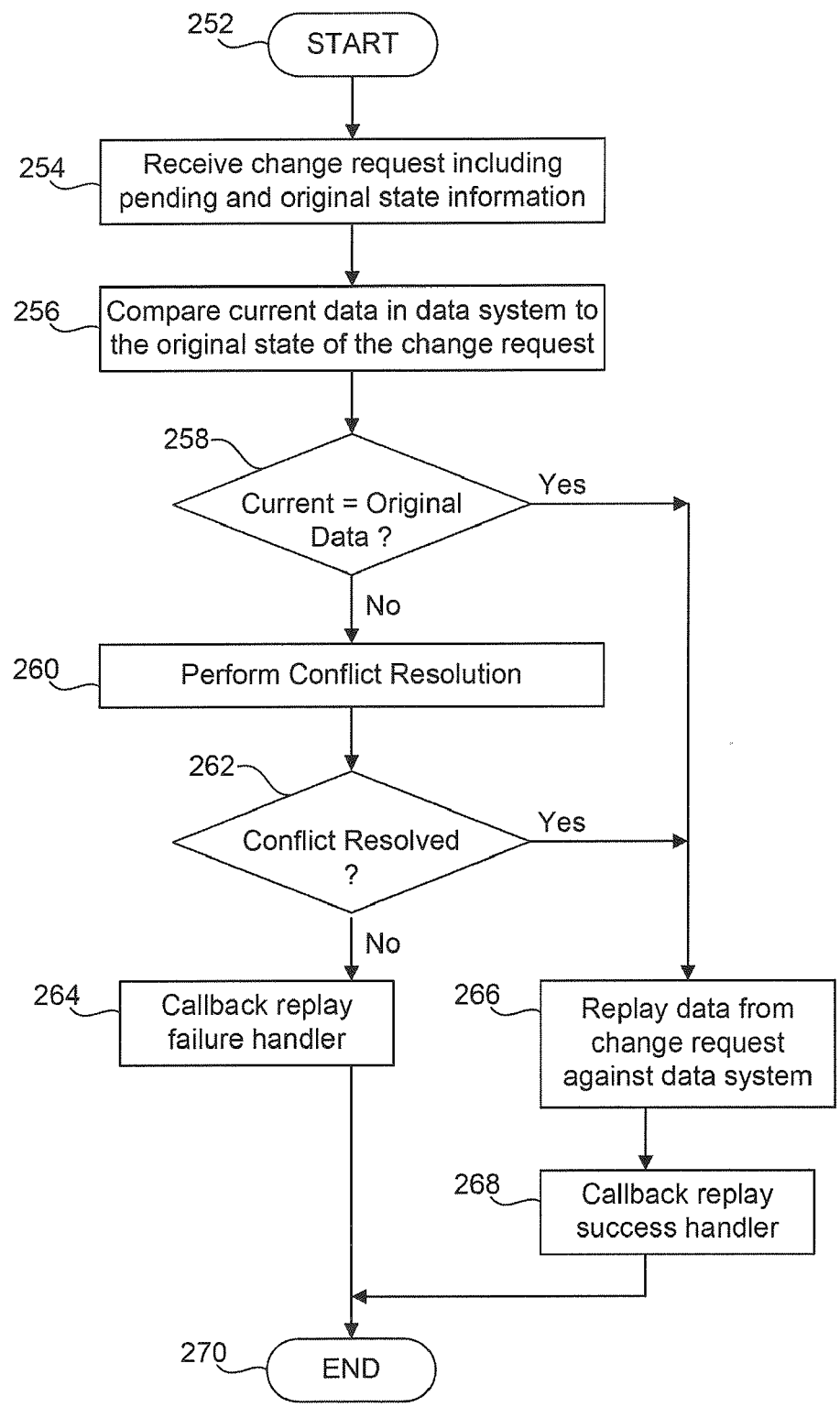
FIG. 2B is a flowchart illustrating steps by which an enterprise information system handles a received create, update, or delete message, in accordance with an embodiment of the present invention.

FIG. 2B is a flowchart 250 illustrating steps by which EIS 114 handles a received CUD message, in accordance with an embodiment of the present invention. The method begins at step 252 and proceeds to step 254 where a CUD message is received, including the pending change and the original state information.

At step 256, the corresponding current data stored within enterprise data system 116 is compared to the original state specified in the change request. A determination is made at step 258 as to whether the current data is equivalent to the original state. If so, then EIS 114 and client application 104 are working off of the same original state baseline, and the pending change can be readily applied to EIS 114. Therefore, the pending change is replayed against enterprise data system 116 at step 266, and any registered replay success handler is called at step 268.

On the other hand, if the current data and original state data differ, then conflict resolution is attempted at step 260, in accordance with an embodiment of the present invention. For example, the non-limiting example conflict resolution process described above for conflicting account balance updates may be used. A determination is made at step 262 as to whether the conflict was resolved, and if so the data can be replayed at step 266 and confirmation of success made to the callback handler at step 268. For example, if EIS 114 chose to resolve a balance discrepancy using the earlier resolution process, EIS 114 would have sufficient information to successfully replay the pending change against enterprise data system 116, and would signal a success at step 268.

However, if the conflict cannot be resolved, or if EIS 114 has been configured to otherwise not attempt to resolve the conflict, a replay failure callback is made at step 264, in accordance with an embodiment of the present invention. The method ends at step 270.

IV. Pending State Management Techniques

While the ability to provide the pending change together with the original state allows EIS 114 to resolve many conflicts, and also allows client application 104 to reverse pending changes if necessary, it is useful to provide a mechanism to reliably retain all of this information at mobile device 102 while the modifications run their course through EIS 114. In accordance with an embodiment of the present invention, pending changes made within local database 108 by client application 104 are not treated as final (i.e., committed) until EIS 114 indicates that the enterprise data system 116 has been updated to reflect the pending change. One skilled in the relevant arts will recognize that modification to existing data may comprise the modification of one or more attributes of an MBO as represented within the local database 108.

The code generator can be configured to assist with management of this information. For each entity, when the code generator is run, two tables within local database 108 are generated, in accordance with an embodiment of the present invention. These two tables are termed the "main table" and the "original state table," in accordance with an embodiment of the present invention.

In accordance with an embodiment of the present invention, the main table is used to reflect the most recent state of data received by mobile device 102. In accordance with a further embodiment of the present invention, whenever data is received from synchronization server 110, it is placed within the main table as the most recently known data, treated generally as if it reflected the current state of enterprise data system 116. Given the potential for intermittent connectivity by mobile device 102 and the last opportunity at which mobile device 102 was able to synchronize with synchronization server 110, the data in the main table may be stale. Nevertheless, the conflict resolution processes described herein, including possibly cancelling a change if necessary, can allow for the treatment of this potentially stale data by the mobile device 102 as the most current data available.

Additionally, whenever the client initiates a modification to existing data, generally through the performance of an update or delete function, the original state of the data is first preserved in the original state table, and the pending change added to the main table. The various ways by which client application 104 may be configured to handle create, update, and delete requests is further detailed below with reference to FIGS. 4, 5, and 6.

Continuing the previous entity examples, a main table based on the Account entity may have the following form:

```
create table Account
(
    surrogateKey integer,
    pendingFlag boolean,
    accountId string,
    customerId string,
    balance decimal,
    pendingChange string,
    replayCounter integer,
    replayPending integer,
    replayFailure integer,
    primary key (surrogateKey, pendingFlag)
)
```

An original state table based on the Account entity may have the following exemplary form:

```
create table Account__os
(
    surrogateKey integer,
    accountId string,
    customerId string,
    balance decimal,
    primary key (surrogateKey)
)
```

In the above exemplary main table, the attributes associated with the entity are created as columns in the table, in accordance with an embodiment of the present invention. Additionally, a pendingFlag is added, and used in combination with the surrogateKey as the key to the Account table. The fields pendingChange, replayCounter, replayPending, and replayFailure are detailed further below. The original state table preserves the original attributes, and is keyed using the surrogate key.

By having the main table keyed with the combination of the surrogate key and a pending flag, it is possible that two entries for a same surrogate key may exist. These two entries will correspond to the most recently downloaded version of the data when the pending flag is false, and to a pending change when the pending flag is true. One skilled in the relevant arts will recognize that other methodologies for organizing the pending state and the downloaded state data exist, and this arrangement is presented by way of example, and not limitation.

Figure 3:
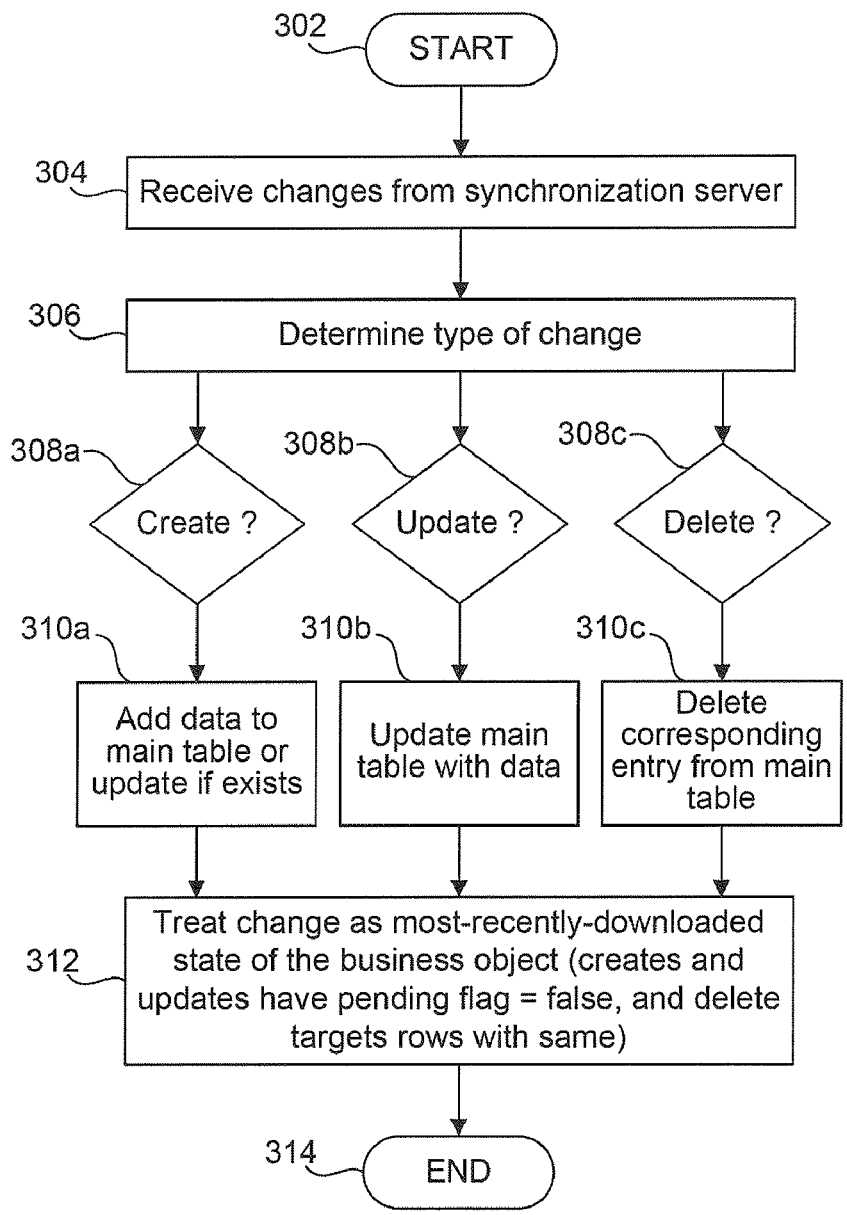
FIG. 3 is a flowchart illustrating steps by which a client application on a mobile device handles a synchronization event received from a synchronization server, in accordance with an embodiment of the present invention.

FIG. 3 is a flowchart 300 illustrating steps by which a client application 104 on mobile device 102 handles a synchronization event received from synchronization server 110, in accordance with an embodiment of the present invention. As will be recognized by one skilled in the relevant arts based on the disclosure herein, the synchronization may be handled by a variety of methodologies, including traditional synchronization methodologies, as well as message-based synchronization as further detailed herein.

The method begins at step 302 and proceeds to step 304 where client application 104 receives changes from the synchronization server 110. At step 306, the particular type of change is determined. In accordance with an embodiment of the present invention, this may be either a create 308a, update 308b, or delete 308c request.

If the request is a create 308a request, client application 104 handles this by adding a row to the main table with the newly-received data at step 310a, in accordance with an embodiment of the present invention. This data, representing the most recently downloaded state, has its pending flag set as false. In accordance with a further embodiment of the present invention, if a corresponding entry in the table already exists (e.g., same surrogate key with pending flag set false), then the create 308a request may be treated instead as an update 308b in order to ensure that synchronization with EIS 114 is maintained. An example query to apply the create 308a request may be:

```
insert into Account (surrogateKey, pendingFlag, accountId,
        customerId, balance, pendingChange, replayCounter,
        replayPending, replayFailure)
    values (1000, false, "123", "Jim", 100, "N", 0, 0, 0)
```

This created row indicates that a new entry corresponding to surrogate key 1000, which is not a pending change (i.e., it is the most recently downloaded state), has the corresponding attribute values.

At step 308b, an update request is received, in accordance with an embodiment of the present invention. A row within the main table having the corresponding surrogate key and with pending flag set as false is updated using the data at step 310b. In accordance with a further embodiment of the present invention, the update request is treated as a create 308a if a corresponding row to be updated does not exist. An example query to apply the update 308b request, continuing the previous example, may be:

```
update Account set balance = 150
    where surrogateKey = 1000 and pendingFlag = false
```

Once again, as the update request received via synchronization server 110 represents the most recently downloaded state, this change should affect an entry that has the pending flag set as false.

If the request is instead a delete request 308c, then the corresponding entry is deleted from the main table at step 310c. As before, this corresponding entry would match the surrogate key and have the pending flag set as false, in accordance with an embodiment of the present invention. An example query to apply the delete 308c request may be:

```
delete from Account
    where surrogateKey = 1000 and pendingFlag = false
```

Step 312 clarifies the treatment of these changes. Any change introduced by a
CUD message received from EIS 114 via synchronization server 110 is treated as the most-recently-downloaded state of an MBO. One skilled in the relevant arts will recognize that the particular embodiment herein gives preference to maintaining synchronization as best as possible with enterprise data system 116, although other approaches may be used. The method ends at step 314.

Figure 4:
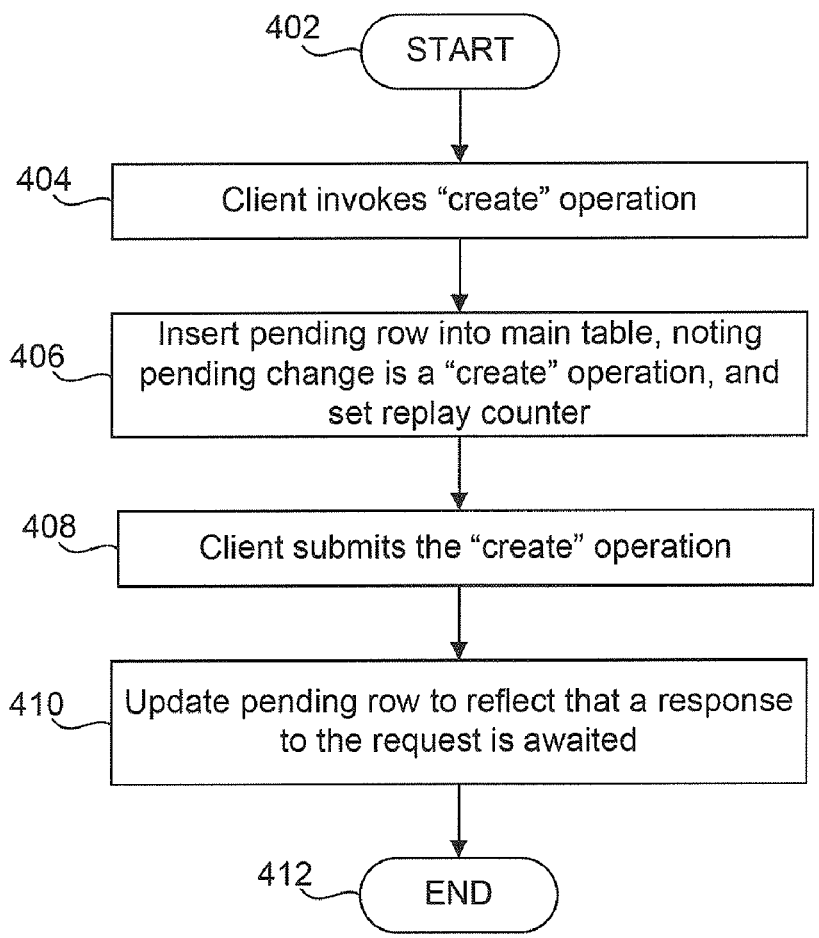
FIG. 4 is a flowchart illustrating steps by which a client application initiates a create request, in accordance with an embodiment of the present invention.

Client application 104 may also initiate CUD messages, which will need to be synchronized, via synchronization server 110, with the data in enterprise data system 116. FIG. 4 is a flowchart 400 illustrating steps by which a client application 104 initiates a create request, in accordance with an embodiment of the present invention. The method begins at step 402 and proceeds to step 404 where the client application 104 invokes a create operation. At step 406, a pending row is inserted into the main table, such that its attributes are set as desired and the pending flag is set to true, responsive to the invokation.

Additionally, the previously mentioned pendingChange field is set to indicate that the change is a create operation, in accordance with an embodiment of the present invention. In accordance with a further embodiment of the present invention, this is accomplished by setting the field to a "C", or other string recognized as indicating a create operation.

A distinction is made between when a client application 104 invokes an operation, such as the create operation, and when the client application. 104 actually submits the operation. Invocation of the operation corresponds to the previously detailed update( )method (e.g., account.update( )), which stores the changes to the local database 108 as pending changes. Submission of the operation (e.g., account.submitPending( )) is an indication to queue the change for submission to EIS 114 via synchronization server 110, in accordance with an embodiment of the present invention. Prior to submission, client application 104 may choose to cancel the change (e.g., account.cancelPending( )), which simply deletes the pending change from the main table.

When the create operation is invoked by client application 104, the replayCounter column is set to a unique non-zero value, greater than any replayCounter value previously used in local database 108, in accordance with an embodiment of the present invention. As will be seen later, this provides the functionality used to match responses from EIS 114 to the pending change. One skilled in the relevant arts will recognize that other methodologies for associating a pending change with response messages may exist, and the use of the replayCounter (and replayPending and replayFailure) fields is by way of example, and not limitation.

Continuing with the previous example, and not by limitation, invocation of the create operation may result in the following exemplary query being executed:

```
insert into Account (surrogateKey, pendingFlag, accountId,
        customerId, balance, pendingChange, replayCounter,
        replayPending, replayFailure)
    values (1000, true, "123", "Jim", 300, "C", 20001, 0, 0)
```

In this exemplary insertion, a pending change (as denoted by the pendingFlag field being true) with surrogate key value 1000 is created in the main table. The pending change is labeled as "C" for create, and the replay counter is set to 20001, which in this example is the next number to be used in an upward counting sequence of replay counter values.

When the create operation is submitted by client application 104 to synchronization server 110 at step 408, a change request is queued to the synchronization server including the pending change to be applied, in accordance with an embodiment of the present invention. The replayPending column is then set to indicate that the client application 104 is waiting for a response to the request from EIS 114, using the following exemplary query:

```
update Account set replayPending = 20001
    where surrogateKey = 1000 and pendingFlag = true
```

By setting the replayPending field, it is possible to match this pending change to a callback, either success or failure, received from EIS 114. The method ends at step 412.

Figure 5:
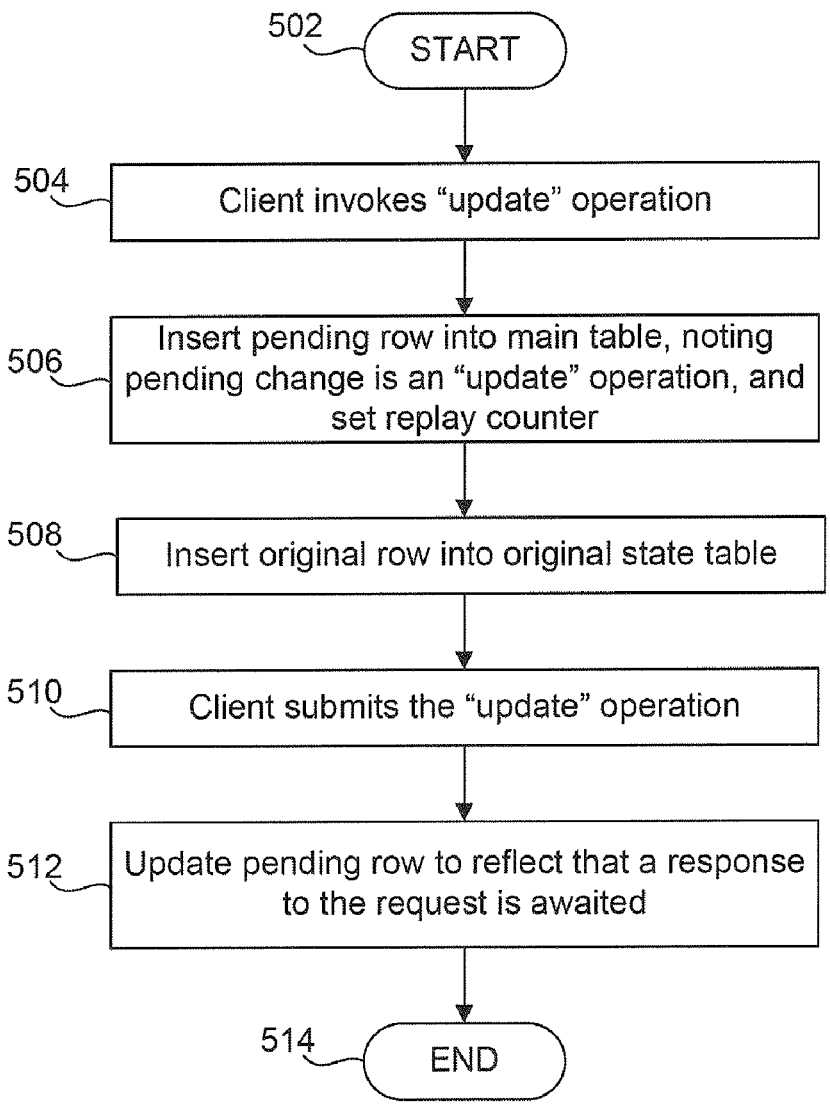
FIG. 5 is a flowchart illustrating steps by which a client application initiates an update operation, in accordance with an embodiment of the present invention.

FIG. 5 is a flowchart 500 illustrating steps by which a client application 104 initiates an update operation, in accordance with an embodiment of the present invention. At step 504, the client application 104 invokes an update operation. As with the create operation detailed above, this results in the insertion of a pending row into the main table. In an embodiment, this is accomplished using the following exemplary query:

```
insert into Account (surrogateKey, pendingFlag, accountId,
        customerId, balance, pendingChange, replayCounter,
        replayPending, replayFailure)
    values (1000, true, "123", "Jim", 200, "U", 20002, 0, 0)
```

This operation has the effect of updating the balance of account ID 123 to 200. However, rather than modifying the most recently downloaded state in the main table, a pending state version (pendingFlag=true) is created, with the same surrogate key. Here, the change is marked as "U" for update, and given the next unique replayCounter value of 20002.

However, it is also necessary to preserve the original state of this MBO data, so that it can be used in conflict resolution. An exemplary query for this may be:

```
insert into Account_os (surrogateKey, accountId, customerId,
        balance)
    values (1000, "123", "Jim", 100)
```

By preserving the original state in the original state table, knowledge is retained regarding the original state of the MBO data at the time the update was performed. Although immediately after execution of the above queries, it is likely that the MBO data inserted into the original state table is equivalent to the downloaded state data within the main table, other events may occur that could modify the downloaded state data, such as the download of updated data from synchronization server 110. In such an event, it is necessary to still possess knowledge of the original state on which the pending update is based.

In accordance with an embodiment of the present invention, if the MBO being updated already has an associated pending state, then the existing pending row is updated rather than a new row being inserted. Moreover, the previously created original state data will be retained as the basis for the subsequent pending change. An exemplary query for this update may be:

```
update Account set balance = 200, pendingChange = "U",
        replayCounter = 20002
    where surrogateKey = 1000 and pendingFlag = true
```

At step 510, client application 104 submits the pending update operation, in accordance with an embodiment of the present invention. As with the create operation, above, a change request is queued to the synchronization server including the pending change to be applied, in accordance with an embodiment of the present invention. The replayPending column is then set to indicate that the client application 104 is waiting for a response to the request from EIS 114, using the following exemplary query:

```
update Account set replayPending = 20002
    where surrogateKey = 1000 and pendingFlag = true
```

By setting the replayPending field, it is again possible to match this pending change to a callback, either success or failure, received from EIS 114. The method ends at step 514.

Figure 6:
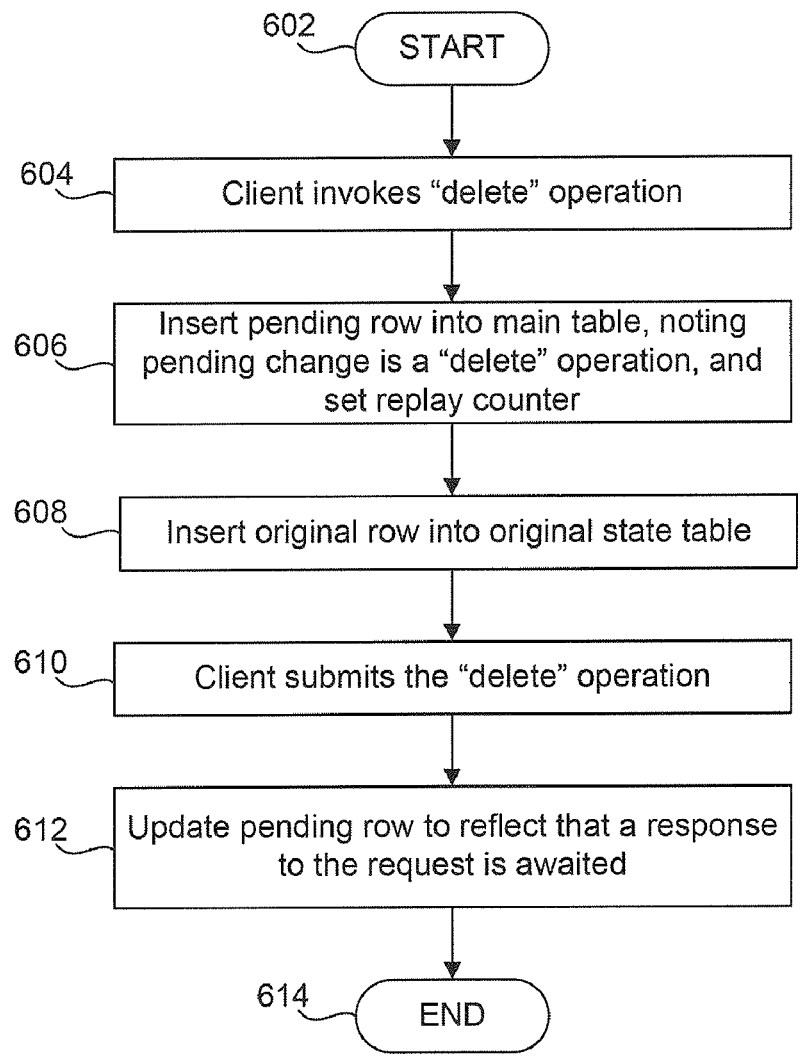
FIG. 6 is a flowchart illustrating steps by which a client application initiates a delete operation, in accordance with an embodiment of the present invention.

FIG. 6 is a flowchart 600 illustrating steps by which a client application 104 initiates a delete operation, in accordance with an embodiment of the present invention. The behavior of the delete operation is in many ways similar to an update operation, except that the operation is labeled with "D" for delete in the pendingChange field, in accordance with a further embodiment of the present invention.

As with an update, the client application 104 invokes the delete operation at step 604. As a result, client application 104 inserts the pending change into the main table and sets the replay counter appropriately at step 606. An exemplary query for this may be:

```
insert into Account (surrogateKey, pendingFlag, accountId,
        customerId, balance, pendingChange, replayCounter,
        replayPending, replayFailure)
    values (1000, true, "123", "Jim", 100, "D", 20003, 0, 0)
```

Likewise, at step 608, data corresponding to the original state is inserted into the original state table. An exemplary query for this may be:

```
insert into Account_os (surrogateKey, accountId, customerId,
        balance)
    values (1000, "123", "Jim", 100)
```

In accordance with an embodiment of the present invention, if the MBO being deleted already has an associated pending state, then the existing pending row is updated to indicate a deletion rather than a new row being inserted. Moreover, the previously created original state data will be retained as the basis for the subsequent pending change. An exemplary query for this update may be:

```
update Account set pendingChange = "D", replayCounter = 20003
    where surrogateKey = 1000 and pendingFlag = true
```

At step 610, the client application 104 submits the delete operation for processing by EIS 114 via synchronization server 110, in accordance with an embodiment of the present invention. Here, as before, a change request is queued to the synchronization server including the pending change to be applied, in accordance with an embodiment of the present invention. The replayPending column is then set to indicate that the client application 104 is waiting for a response to the request from EIS 114, using the following exemplary query:

```
update Account set replayPending = 20003
    where surrogateKey = 1000 and pendingFlag = true
```

By setting the replayPending field, it is again possible to match this pending change to a callback, either success or failure, received from EIS 114. The method ends at step 614.

Figure 7:
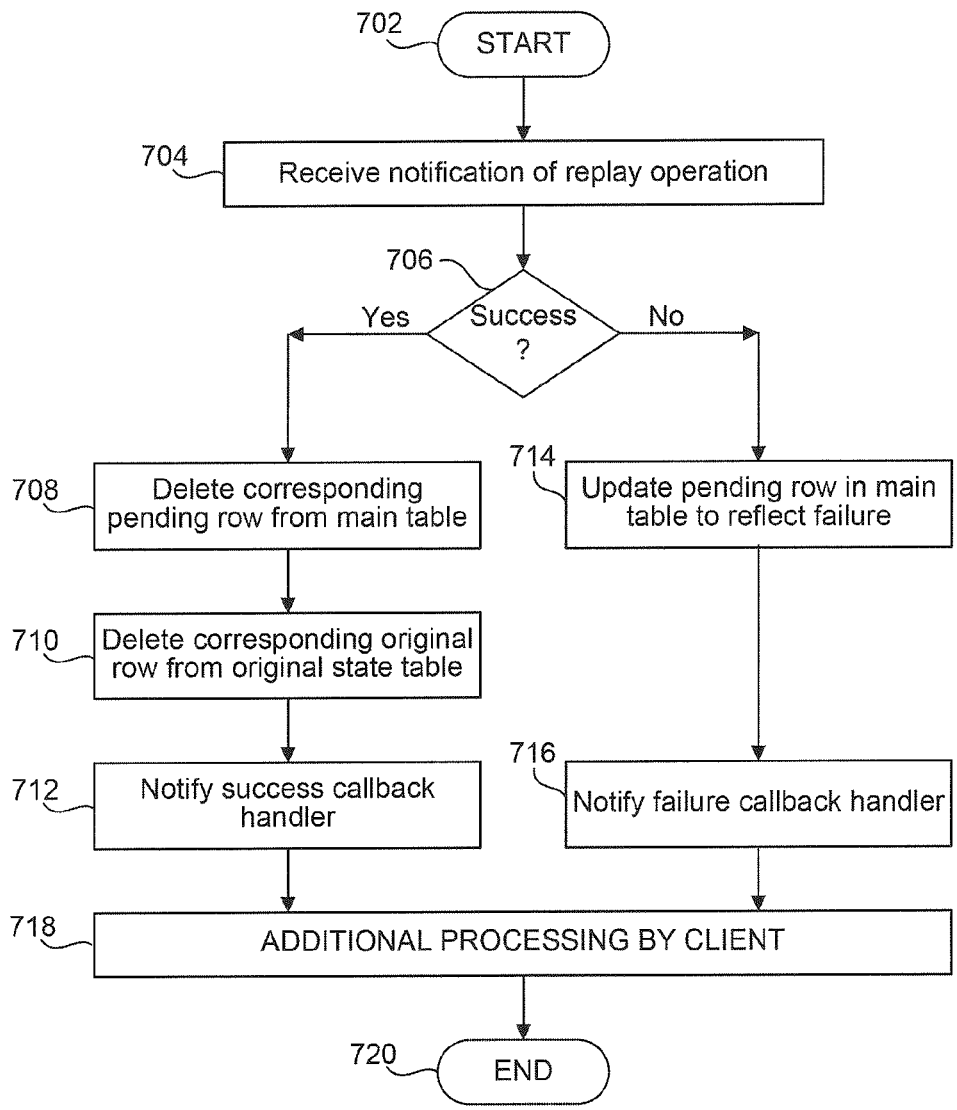
FIG. 7 is a flowchart illustrating steps by which client application is configured to respond to a replay operation callback, in accordance with an embodiment of the present invention.

FIG. 7 is a flowchart 700 illustrating steps by which client application 104 is configured to respond to a replay operation callback, in accordance with an embodiment of the present invention. One skilled in the relevant arts will appreciate that notification methodologies other than callbacks may be employed to similar effect, but callbacks are presented herein by way of example, and not limitation.

The method begins at step 702 and proceeds to step 704 where client application 104 is notified of the result of a replay operation, in accordance with an embodiment of the present invention. As noted, this may be in the form of a callback. Replaying at EIS 114 and generating the resulting callbacks is discussed in further detail above with reference to flowchart 250 of FIG. 2B.

At step 706, a determination is made as to whether the replay of a particular pending change was successful. In accordance with an embodiment of the present invention, this is handled by receiving a callback on a success callback handler separate from receiving a callback on a failure callback handler.

If the replay operation was successful, then the method proceeds to step 708 where the corresponding pending row is deleted from the main table. In accordance with an embodiment of the present invention, this deletion takes place only if the replayPending value of the pending row matches the replayCounter value associated with the successful replay. If there is a mismatch, the entire notification is ignored in order to ensure that only the response to the last submitted operation is processed, in accordance with a further embodiment of the present invention. An exemplary query for deleting the pending row may read:

```
delete from Account
    where surrogateKey = 1000 and pendingFlag = true
```

Additionally, at step 710, the corresponding original row is deleted from the original state table, in accordance with an embodiment of the present invention. An exemplary query for deleting the original state row may read:

```
delete from Account_os
    where surrogateKey = 1000
```

At step 712, a success callback handler is notified, in accordance with an embodiment of the present invention. In accordance with an embodiment of the present invention, the steps outlined in flowchart 700 are performed in code provided by a code generator and incorporated into client application 104 by a developer. A developer of client application 104 may have additional operations that should be performed upon a success or failure, and may register a success or failure callback handler to perform any additional processing. If one such callback handler has been registered, then it is notified at step 712, and control is handed over to this callback handler for additional processing at step 718.

If instead the replay operation failed, the method proceeds to step 714 where the pending change row in the main table is updated to reflect this failure, in accordance with an embodiment of the present invention. As with a replay success, this is only performed if there is a match between the replayPending value of the pending row and the replayCounter value associated with the successful replay. If there is a mismatch, the entire notification is ignored in order to ensure that only the response to the last submitted operation is processed, in accordance with a further embodiment of the present invention. An exemplary query for updating the pending row accordingly may read:

```
update Account set replayPending = 0, replayFailure = 20001
    where surrogateKey = 1000 and pendingFlag = true
```

At step 716, a failure callback handler for client application 104 is notified, if one is registered, in accordance with an embodiment of the present invention. Any additional processing by client application 104 is then performed responsive to this callback at step 718. The method ends at step 720.

V. Query Processing Techniques

The above-described methodology for maintaining a pending state in the same main table where a download state may reside allows for the possibility of two existing rows for a same MBO, such as when a pending update or delete operation exists. Accordingly, queries written against the main table must account for potential duplicates.

For example, if an update is made to an existing MBO record, starting with no pending changes, a developer of client application 104 may run into the following difficulty:

```
var oldAccounts = Account.findByCustomer("123");
var firstAccount = oldAccounts[0];
firstAccount.balance = firstAccount.balance + 100;
firstAccount.update( ); // this creates a pending change
```

Now if the same query to find an account by customer number 123 is run, it will return both the downloaded state and the pending change, unless the developer is tasked with resolving this difficulty.

```
var newAccounts = Account.findByCustomer ("123");
assert newAccounts.length == oldAccounts.length;
```

The assertion above will fail unless some behind-the-scenes processing takes place to sanitize the query results before they are received by the developer-run procedures. Rather than place the burden on the developer to resolve the issue of distinguishing between downloaded state rows and pending changes, it is possible to handle this transparently.

In accordance with an embodiment of the present invention, the code generator is employed to rewrite named queries in order to ensure that the result of the query execution will eliminate duplicates. In accordance with a further embodiment of the present invention, this is accomplished by returning the pending row for a result, if it exists, or the downloaded state row otherwise.

This allows additional changes to a row for which a pending state exists to be made based off of that pending state data, and therefore also based off of the original state corresponding to that pending state. By adhering to this methodology, subsequent updates and deletes where a pending change exists do not need to recreate the original state, as they will be essentially based off of the same original state as the first pending change.

Using the previously discussed named query Account.findByCustomer:
select a.* from Account a where a.customerId=:id
execution would return two rows where accountId=firstAccount.accountId of the earlier example. One row will have pendingFlag=false, and the other will have pendingFlag=true. In such a case, it is desirable for the result to be the row having pendingFlag=true, for the aforementioned reasons. This query can therefore be reformulated using a correlated subquery against the original state table, such as per the following example:

```
select a.*
    from Account a
    where (a.pendingFlag = true
        or not exists
            (select a__os.surrogateKey
                from Account_os a__os
                where a__os.surrogateKey = a.surrogateKey))
        and a.customerId = :id
```

The above query reformulation may also be achieved using an SQL outer join syntax. Alternatively, the correlated subquery can be made against the main table instead of the original state table, but efficiencies may be had by using the above query based on the likelihood that the original state table will contain fewer rows than the main table. One skilled in the relevant arts will recognize that any number of other such reformulations exist, and the aforementioned query is presented by way of example, and not limitation.

In accordance with a further embodiment of the present invention, it is further possible to sanitize dynamic queries for use with the main table, where both a downloaded state and pending change may co-exist. In a non-limiting exemplary embodiment, a developer of client application 104 may use a dynamic query generating module to specify a dynamic query, such as "query.where(AttributeTest.equal(attribute, testValue))" to test an attribute value in a query "where" clause. The resulting generated query is automatically designed to select the corresponding pending change if present, or the downloaded state otherwise, in accordance with an embodiment of the present invention, and therefore does not need to actively rewrite the query.

VI. Message Based Synchronization

The aforementioned CUD messages sent by client application 104 to EIS 114 via synchronization server 110, and from EIS 114 to client application 104 via synchronization server 110, may be communicated via a messaging system described herein. This message synchronization method is designed to support the pending state management techniques previously described, and to make efficient use of client resources and network connections. However, one skilled in the relevant arts will recognize the applicability of the messaging techniques described herein to other situations, and the use of message based synchronization with pending state management is provided by way of example, and not limitation.

Message based synchronization ("MBS") provides the ability to perform synchronizations asynchronously. This means, for example, that a mobile device 102 need not wait until the moment it has connectivity to synchronization server 110 in order to perform a full synchronization. Instead, messages to and from synchronization server 110 can be received intermittently as connectivity becomes available.

In accordance with an embodiment of the present invention, the Java Message Service ("JMS") is employed as the communication channel. Messages are of the type javax.jms.TextMessage where the text content is a JavaScript Object Notation ("JSON") value, in accordance with a further embodiment of the present invention. One skilled in the relevant arts will appreciate that other communication means may be readily employed, and the use of JSON over JMS is provided by way of example, and not limitation.

Messages are sent to a JMS queue (e.g., mbs.N), where N is no greater than the number of queues available in synchronization server 110, in accordance with an embodiment of the present invention. Multiple queues may be used to allow synchronization server 110 to process simultaneous requests from multiple clients. The queues are configured to ensure at-least-once, in-order delivery. As will be apparent to one skilled in the relevant arts, application of messages using the pending state management techniques above more than once will not result in adverse effects, and therefore it is more practical to ensure at-least-once delivery than exactly-once delivery.

In accordance with an embodiment of the present invention, messages are specified for use in either client-to-server or server-to-client communications. Each message specifies a set of headers that define the combination of values to be sent with that message. One skilled in the relevant arts will appreciate that the precise messages and headers shown herein are presented by way of example, and not limitation. For example, messages may use more or fewer headers than shown in these exemplary embodiments, or different sets of headers entirely. Again, although the headers and messages shown herein are intended for use over JMS, one skilled in the relevant arts will appreciate the ability to use these techniques in other messaging means.

i. Usage of JMS Headers

| JMS Header or Property | Description | Example Value |
|---|---|---|
| pkg | String property containing package and version (colon separated). | mypackage:1.0 |
| mbo | String property containing mobile business object (entity) name. | MyEntity |
| cid | Contains a unique identifier for the client's local database. No two client databases will have the same cid. If a client drops and recreates its local database, the new database must have a different cid from the previous database. | urn:uuid:550e8400-e29b-41d4-a716-446655440000 |
| pid | Contains a physical identifier for the device a subscription originates from. | 01-23-45-67-89-ab |
| app | Contains an application name that represents the logical entity of an application on a physical device from which a subscription originates. | BankApp |
| ppm | String property containing personalization parameter map, which is a base 64 encoding of a JSON object containing name/value pairs. | before base 64 encoding: {"language":"en","eis.username":"eis user","eis.password":"eispass"} |
| upa | String property containing base 64 encoding of "username:password" (like value of HTTP Basic Authorization header). | dGVzdDp0ZXN0MTIz (for "test:test123") |
| method | String property containing method for this request. | replay |
| id | String property containing client-generated unique ID for a request (the replayPending value from a submitted pending row). The server includes the same ID in the reply, to allow the client to correlate the reply with its request. | 12345 |
| log | String property containing server-generated log messages. | See MBS Log Records below |
| pushTo | String property used when a subscription is established. Indicates the queue to which the server should send subsequent asynchronous messages. | sup.imo.1 |
| replyTo | String property used to indicate the queue to which the server should send immediate reply messages. Operations supporting replyTo can effectively be invoked synchronously by the client using the sync-over-async pattern. | xxx.2.3 |
| loginFailed | Boolean property (default false) indicating whether a request failed due to authentication failure. | true | ii. Client to Server Messages

| Method | Description | Required JMS Headers (Optional JMS Headers) | Example JSON Content |
|---|---|---|---|
| login | Request for server to validate client's credentials (in "upa" header). | pkg, cid, pid, upa, method, id (app, ppm, replyTo) | { } |
| subscribe | Request that "import" messages be sent to the client for data currently in the server's cache, as well as whenever data changes in the server's cache. Specifies pushTo to indicate where subsequent asynchronous messages from the server to this client should be sent. | pkg, cid, pid, upa, method, id, pushTo (app, ppm, replyTo) | { } |

-continued

| Method | Description | Required JMS Headers (Optional JMS Headers) | Example JSON Content |
|---|---|---|---|
| unsubscribe | Cancel a subscription, so that no more "import" messages will be received from the server. Must send a "subscribe" message to resume imports. | pkg, cid, pid, upa, method, id (app, ppm, replyTo) ke | { } |
| suspend | Suspend a subscription, so that no more "import" messages will be received from the server. Must send a "resume" message to resume imports. | pkg, cid, pid, upa, method, id (app, ppm, replyTo) | { } |
| resume | Resume a previously suspended subscription. Note that sending "suspend" and then "resume" is more efficient than sending "unsubscribe" and then "subscribe". | pkg, cid, pid, upa, method, id (app, ppm, replyTo) | { } |
| replay | Request for server to replay an operation. Legal "_op" values are "C" (create), "U" (update), "D" (delete) and "P" (parent). Apart from "_op" and relationship fields, for "D" and "P" only key fields need to be present. For "C" and "U", values for key and non-key fields must be present. | pkg, mbo, cid, pid, upa, method, id (app, ppm, replyTo) | {"_op":"U","surrogateKey": 1000,"accountId":"123","cu stomerId":"Jim","balance" :2 00,"_os":{"surrogateKey":1 000,"accountId":"123","cust omerId":"Jim","balance":10 0}} |
| search | Request for server to search its consolidated database (or backend system) using a named query or dynamic query. The optional "skip" and "take" fields allow a selected page of results to be returned by the server. If "take" is zero or unspecified, there is no limit on the result size, which in some cases could result in very large "searchResult" messages. | pkg, mbo, cid, pid, upa, method, id (app, ppm, replyTo) | {"searchId":3001,"namedQu ery":"findByName","param eters": {"firstName":"Elton", "lastName":"John"},"skip": 0,"take":100} | iii. Server to Client Messages

| Method | Description | Required JMS Headers (Optional JMS Headers) | Example JSON Content |
|---|---|---|---|
| loginResult | Notification that a "login" request from this client was successful. | pkg, cid, method, id (log) | { } |
| loginFailed | Notification that a "login" request from this client was unsuccessful. | pkg, cid, method, id (log, loginFailed) | { } |
| subscribeResult | Notification that a "subscribe" request from this client was successful. | pkg, cid, method, id (log) | { } |
| subscribeFailed | Notification that a "subscribe" request from this client was unsuccessful. | pkg, cid, method, id (log, loginFailed) | { } |
| unsubscribeResult | Notification that an "unsubscribe" request from this client was successful. | pkg, cid, method, id (log) | { } |
| unsubscribeFailed | Notification that an "unsubscribe" request from this client was unsuccessful. | pkg, cid, method, id (log, loginFailed) | { } |
| suspendResult | Notification that a "suspend" request from this client was successful. | pkg, cid, method, id (log) | { } |

-continued

| Method | Description | Required JMS Headers (Optional JMS Headers) | Example JSON Content |
|---|---|---|---|
| suspendFailed | Notification that a "suspend" request from this client was unsuccessful. | pkg, cid, method, id (log, loginFailed) | { } |
| resumeResult | Notification that a "resume" request from this client was successful. | pkg, cid, method, id (log) | { } |
| resumeFailed | Notification that a "resume" request from this client was unsuccessful. | pkg, cid, method, id (log, loginFailed) | { } |
| replayResult | Notification that a "replay" request from this client was accepted by the server. The content will only include key fields from the root object in the original "replay" request. | pkg, cid, mbo, method, id (log) | {"surrogateKey":1000} |
| replayFailed | Notification that a "replay" request from this client was rejected by the server. The content will only include key fields from the root object in the original "replay" request. | pkg, cid, mbo, method, id (log, loginFailed) | {"surrogateKey":1000} |
| searchResult | Notification that a "search" request from this client was successful, together with result rows. A query that returns no matching results is considered successful. | pkg, cid, mbo, method, id (log) | {"searchId":3001,"resultRows":[{"pk":101,"firstName":"Elton","lastName":"John","occupation":"Singer"},{"pk":102,"firstName":"Elton","lastName":"John","occupation":"Chef"}]} |
| searchFailed | Notification that a "search" request from this client was unsuccessful. | pkg, cid, mbo, method, id (log, loginFailed) | {"searchId":3001} |
| import | Import data from the server's cache. Legal "_op" values are "C" (create), "U" (update), "D" (delete) and "P" (parent). A client, upon receiving an "_op" of "U", needs to be prepared to insert or update a row in its local database. Apart from "_op" and relationship fields, for "D" and "P" only key fields need to be present. For "C" and "U", values for key and non-key fields must also be present. Changes for related child objects (in a cascading relationship) can be nested in their parent, or sent in independent import messages. Multiple root objects may be batched in a single message. However, the server should limit the number of objects (batch size) in an import message to avoid creating messages that are too large for the client MBO layer to parse (on memory-constrained mobile devices). | pkg, cid, mbo, method | [{"_op":"P","id":3,"customerId":3000,"orderLines":[{"_op":"C","productId":1001,"orderId":3,"quantity":1,"id":4},{"_op":"U","id":5,"productId":2001,"orderId":3,"quantity":2}]}] |

A number of the aforementioned MBS messages may be styled as failure messages. In accordance with an embodiment of the present invention, MBS failure messages use a number scheme based on HTTP status codes to indicate the error. For example, code 401 indicates that the client request had invalid credentials, or that authentication failed for some other reason. Code 403 indicates that the client request had valid credentials, but that the user does not have permission to access the request resource (e.g., a package, MBO, or operation). Error code 404 indicates an attempt to access a non-existent package or MBO. Code 500 is used to indicate an unspecified error. One skilled in the relevant arts will recognize that a number of error coding schemes may be used, and the aforementioned scheme is provided by way of example, and not limitation.

As shown above, when the synchronization server 110 sends a replayResult, replayFailed, searchResult, or searchFailed message, among other possible cases, a log may optionally be included encoded as a JSON array of log records, in accordance with an embodiment of the present invention. Each log record is encoded as a JSON object including the following fields, in accordance with a further embodiment of the present invention:

| Field | Value | Optional/Required |
|---|---|---|
| "level" | One of: "debug", "info", "warn", "error", "fatal". | Required |
| "code" | A int value containing the message code. | Optional |
| "message" | A string value containing the message text. | Required |
| "timestamp" | A dateTime value indicating when the message was produced. | Required |
| "eisCode" | A string value containing the backend EIS code. | Optional |
| "component" | The Mobile Business Object name. | Optional |
| "entityKey" | A string value of the mbo surrogate key. | Optional |
| "operation" | A string value containing the invoked operation name. | Optional |
| "requestId" | A string value containing the client's replay counter. | Optional |

For example, a log included with the replayResult message may read:

```
[{"level":"warn",
    "message":"The name was too long so I truncated it.",
    "timestamp":"2001-01-01 12:34:56.789"}]
```

A further exemplary log included with the replayFailed message may read:

```
[{"level":"error",
    "message":"The name was too long so I rejected it.",
    "timestamp":"2001-01-01 12:34:56.789"}]
```

In accordance with an embodiment of the present invention, log messages are persisted within local database 108 for use by client application 104. Client application 104 may, for example, choose to output an error message to a user via device output 106. In accordance with a further embodiment of the present invention, the log messages remain persisted to the local database 108 until they are deleted by client application 104.

When synchronization server 110 receives a message from client application 104, the uniqueness of the message is determined via a combination of the client ID ("cid", above) and the message ID ("id", above). As indicated above, the cid is a unique identifier for a particular client's local database (e.g., unique to local database 108). One skilled in the relevant arts will appreciate that the uniqueness of the cid may be tied to other entities within mobile device 102, or to the device itself, depending on the configuration. In accordance with an embodiment of the present invention, each local database 108 of each mobile device 102 and 112a-c is assigned its own unique cid. In a non-limiting exemplary embodiment of the present invention, the cid can be a Universally Unique Identifier ("UUID"), although one skilled in the relevant arts will recognize that other identifier techniques may be applied.

The message ID, simply shown as id in the header list, is a client selected unique ID for the message, in accordance with an embodiment of the present invention. In accordance with a further embodiment of the present invention, when MBS is used for persistent state management based on the techniques discussed above, the id field corresponds to the replayPending value associated with a pending change row. When the synchronization server 110 responds to this message, it will use this same value as its own ID for the reply, in order to allow client application 104 to associate the reply with the pending change, per the techniques discussed above.

Figure 8:
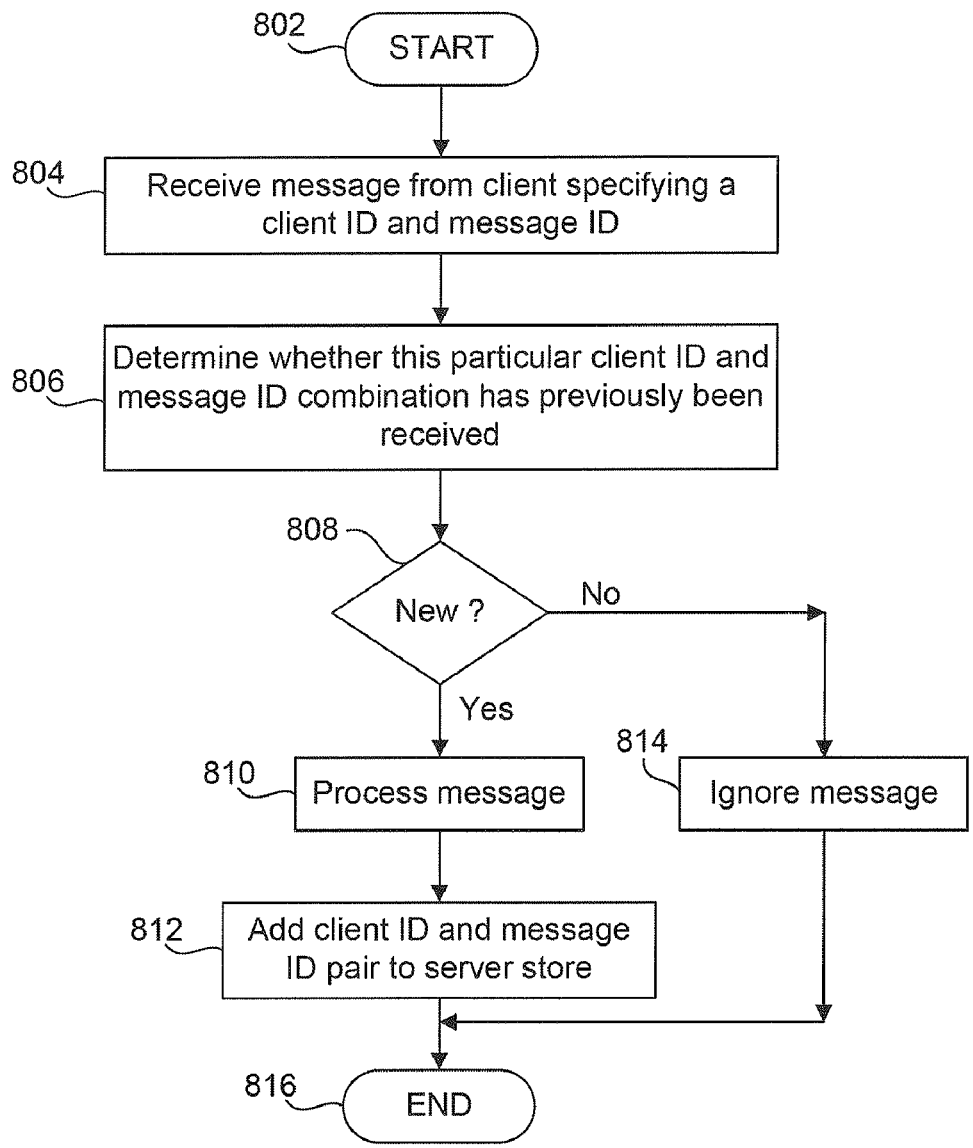
FIG. 8 is a flowchart illustrating steps by which a synchronization server is configured to detect and discard duplicate messages, in accordance with an embodiment of the present invention.

In order to further support at-least-once delivery, a synchronization server 110 and EIS 114 receiving a message from client application 104 must ensure that a message does not get replayed twice. FIG. 8 is a flowchart 800 illustrating steps by which a synchronization server 110 or EIS 114 is configured to detect and discard duplicate messages, in accordance with an embodiment of the present invention. In accordance with an embodiment of the present invention, message processing is handled at synchronization server 110, such that any duplicates are discarded prior to receipt by EIS 114.

The method begins at step 802 and proceeds to step 804 where a message is received specifying a cid and an id, in accordance with an embodiment of the present invention. At step 806, a determination is made as to whether this combination of cid and id has been previously received, in accordance with a further embodiment of the present invention. This determination is made by comparing the received cid and id to a list of previously received cid and id pairs, in accordance with an embodiment of the present invention.

At step 808, a determination is made as to whether the message is new, or if it has previously been received. If previously received, the method proceeds to step 814 where the message is ignored, and the method ends at step 816. However, if the message is new, then its contents are processed at step 810. In the case of persistent state management using MBS, the messages are generally instructions from the client application 104 to the server to replay a change against enterprise data system 116, and so would be processed at step 810.

In order to ensure that this new message is tracked, the cid and id of the message is added to the list of previously received messages at step 812. In accordance with an embodiment of the present invention, these cid and id pairs are stored in the cache database of synchronization server 110. The method then ends at step 816.

Most message types available for communication from the synchronization server 110 to client application 104 provide replies to communications initiated by client application 104, in accordance with an embodiment of the present invention. It is also possible for EIS 114, via synchronization server 110, to send updates of relevant MBOs as changes occur within enterprise data system 116. A message type for handling this communication is shown above in the Server to Client Messages table as the "import" message. Import messages are sent by the synchronization server 110 to a client application 104 to notify the client application of one or more changes that have occurred within EIS 114 that may be of interest to client application 104.

In order to support this functionality, each MBO has a corresponding cache table (or "virtual table") in a cache database within synchronization server 110, in accordance with an embodiment of the present invention. The cache table stores attribute information for the MBO retrieved from enterprise data system 116, along with information to assist in the synchronization of data to local database 108. An exemplary cache table, following from the earlier examples, may be:

```
create table Account_vt
(
    surrogateKey integer,
    accountId string,
    customerId string,
    balance decimal,
    deletedFlag boolean,
    lastModified dateTime,
    primary key (surrogateKey)
)
```

This cache table contains fields for indicating the last time the MBO was modified by EIS 114, and whether it has been deleted within enterprise data system 116.

Figure 9:
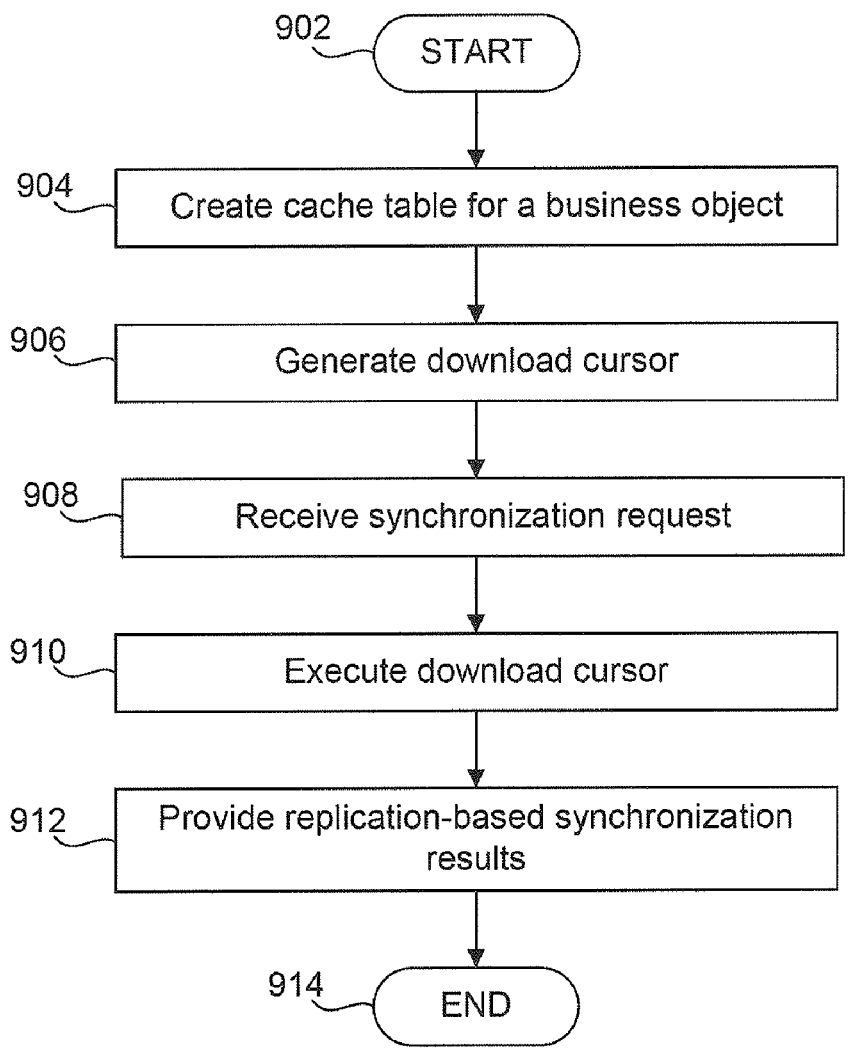
FIG. 9 is a flowchart illustrating steps by which replication based synchronization can be performed using a cache table, in accordance with an embodiment of the present invention.

FIG. 9 is a flowchart 900 illustrating steps by which replication based synchronization ("RBS"), as opposed to MBS, can be performed using the cache table, in accordance with an embodiment of the present invention. This method allows a client application 104 to request synchronization with the data held by synchronization server 110 in its cache tables. The method begins at step 902 and proceeds to step 904 where a cache table, such as the one above, is created for an MBO, in accordance with a further embodiment of the present invention.

At step 906, a download cursor is generated, in accordance with a further embodiment of the present invention. A download cursor is a query that operates against a cache table in order to determine differences since the client application's 104 last synchronization. For example, a download cursor may be written as:

```
select a.* from Account_vt a
    where a.lastModified >= :lastDownload
```

Here, the client application 104 is requesting that all accounts that have been modified since the client application's 104 last synchronization be retrieved. The lastDownload parameter is remembered by client application 104 as a timestamp generated by the cache database before the client's previous synchronize action. Accordingly, in the above example, only accounts that have been modified by EIS 114 subsequent to the last synchronize action will be downloaded.

Accordingly, at step 908 a synchronization request is received from client application 104, and the appropriate download cursor is executed at step 910. The results of this query are then provided to client application 104 for storage to local database 108 as the download state, in accordance with an embodiment of the present invention. The method ends at step 914.

Rather than rely on the client application 104 to retrieve synchronized data, it is useful to allow synchronization server 110 to push down relevant results to client application 104 for storage in local database 108 as the data is created, updated, or deleted by EIS 114. In accordance with an embodiment of the present invention, a client application 104 can specify a subscription to a package, and therefore any entities therein. By way of example, and not limitation, client application 104 sends a subscribe message to synchronization server 110 indicating which package it wishes to subscribe to.

Upon receipt of this subscription message, synchronization server 110 creates an entity subscription for each entity within the package. One skilled in the relevant arts will recognize that other suitable means for identifying entities for subscription exist, and the methodology shown is provided by way of example, and not limitation.

An exemplary table used by synchronization server for maintaining entity subscriptions may be defined by:

```
create table EntitySubscription
(
    entityName string,
    clientId string,
    pushTo string,
    lastDownload dateTime,
    primary key (entityName, clientId)
)
```

The entity name specifies the entity that the client associated with the client ID is subscribed to. The pushTo value specifies the name of a message queue the client uses to receive import messages from synchronization server 110. Unlike the previous example, here the lastDownload time is maintained within the EntitySubscription table itself, in accordance with a further embodiment of the present invention.

Accordingly, if a client C1 subscribes to a package containing the Account entity, synchronization server 110 would create an exemplary subscription by:

```
insert into EntitySubscription
    (entityName, clientId, pushTo, lastDownload)
    values ("Account", "C1", "mbs.push.C1", "1900-01-01 00:00:00")
```

In this example, the lastDownload time is set to some value that serves the function of indicating that a download has never been performed for this subscription.

Figure 10:
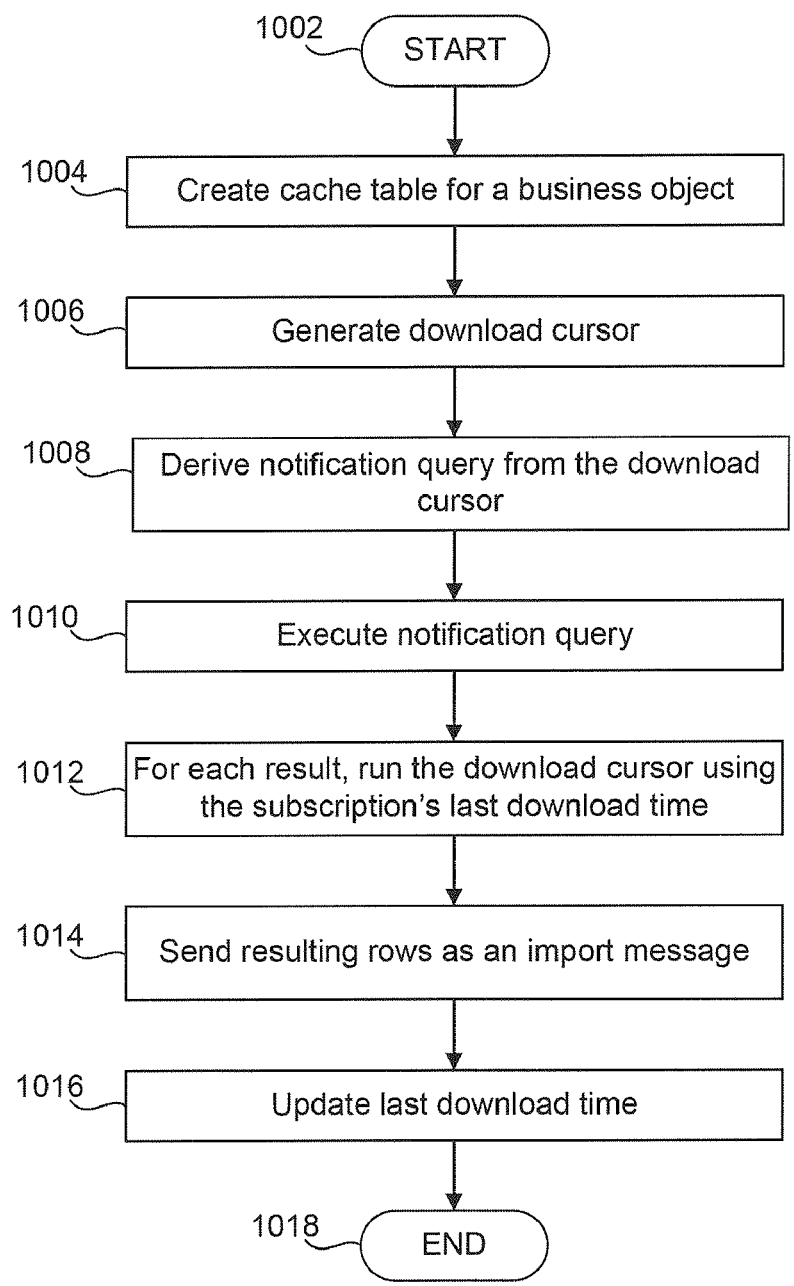
FIG. 10 is a flowchart illustrating steps by which a cache table and download cursor can be used with entity subscriptions to efficiently provide import messages to client applications that require an update, in accordance with an embodiment of the present invention.

FIG. 10 is a flowchart 1000 illustrating steps by which the cache table and download cursor can be used with entity subscriptions to efficiently provide import messages to client applications 104 that require an update, in accordance with an embodiment of the present invention. For example, in the case of many clients (e.g., 10,000 clients) with entity subscriptions for the example Account entity, the synchronization server 110 may make a determination on a schedule of which clients need to be provided changes using an import message. One skilled in the relevant arts will appreciate that a number of reasons exist for the various clients to not have the same data as each other synchronized at the same time, including intermittent connectivity. Sending import messages to all 10,000 clients would be a computationally expensive process if only some subset of the clients require the messages.

Accordingly, the method begins at step 1002 and proceeds to step 1004 where a cache table is created for an MBO, as shown earlier, in accordance with an embodiment of the present invention. A corresponding download cursor is generated at step 1006 as also shown earlier, in accordance with a further embodiment of the present invention.

At step 1008, a notification query is derived from the download cursor, in accordance with an embodiment of the present invention. In accordance with a further embodiment of the present invention, the notification query is derived automatically from the download cursor. An exemplary notification query derived from the above download cursor and the entity subscriptions may be:

```
select s.clientId, s.lastDownload, s.pushTo
    from EntitySubscription s
    where exists
        (select a.surrogateKey
            from Account_vt a
            where a.lastModified >= s.lastDownload)
```

The result of the notification query is to determine which subscriptions the download cursor should be run for. In the above exemplary notification query, this results in identifying all subscriptions that have at least one modified Account.

One skilled in the relevant arts will appreciate that steps 1004, 1006, and 1008 may be performed during a configuration phase, while the remaining steps may be performed whenever a synchronization event is desired, in accordance with an embodiment of the present invention. It is therefore not necessary to create a cache table, generate a download cursor, and derive the notification query each time the notification query is sought to be executed, and these can be persisted within synchronization server 110 for as long as is necessary.

At this point, the current time is stored as "timeBefore", in accordance with an embodiment of the present invention. This provides a reference frame for when the synchronization occurs. Any updates made by EIS 114 after this time will therefore be captured by a subsequent synchronization, whereas they might otherwise be lost if the synchronization time was selected to be some later reference point.

The notification is then executed at step 1010, in accordance with an embodiment of the present invention. Execution of the notification may occur at some predetermined interval (e.g., a notification interval of every 10 seconds) or based on some other schedule or initiation mechanism.

At step 1012, for each result of the notification query, the download cursor is run using the parameter value :lastDownload=s.lastDownload. This means that the download cursor will use as the last download time the last download time obtained from the entity subscription, in accordance with an embodiment of the present invention. Through this mechanism, client application 104 will not be responsible for providing the last download time, as it is obtained from the entity subscription.

The result of executing the download cursor for each result of the notification query is a set of result rows containing updates that should be imported to the local database 108 of mobile device 102, in accordance with an embodiment of the present invention. Accordingly, for each resulting row, an import message is sent to the corresponding queue at step 1014 for the associated subscription, in the above exemplary case the queue defined by s.pushTo.

At step 1016, the last download time for each subscription is set to the timeBefore value obtained prior to execution of the notification query, in accordance with an embodiment of the present invention. This allows future execution of the notification query to capture any changes which may have occurred during execution, as well as any that occur subsequent thereto. The method ends at step 1018.

VII. Batched Import Messages

The aforementioned import messages may not contain a large amount of data. Additionally, a particular client application 104 may receive a number of import message simultaneously as a result of several subscriptions having synchronization events triggered by the notification query. As a result, it is useful to send several import messages together as a batch in order to maximize use of the communication channel. However, any such batching process may need to take into account memory and other constraints of mobile device 102.

Figure 11:
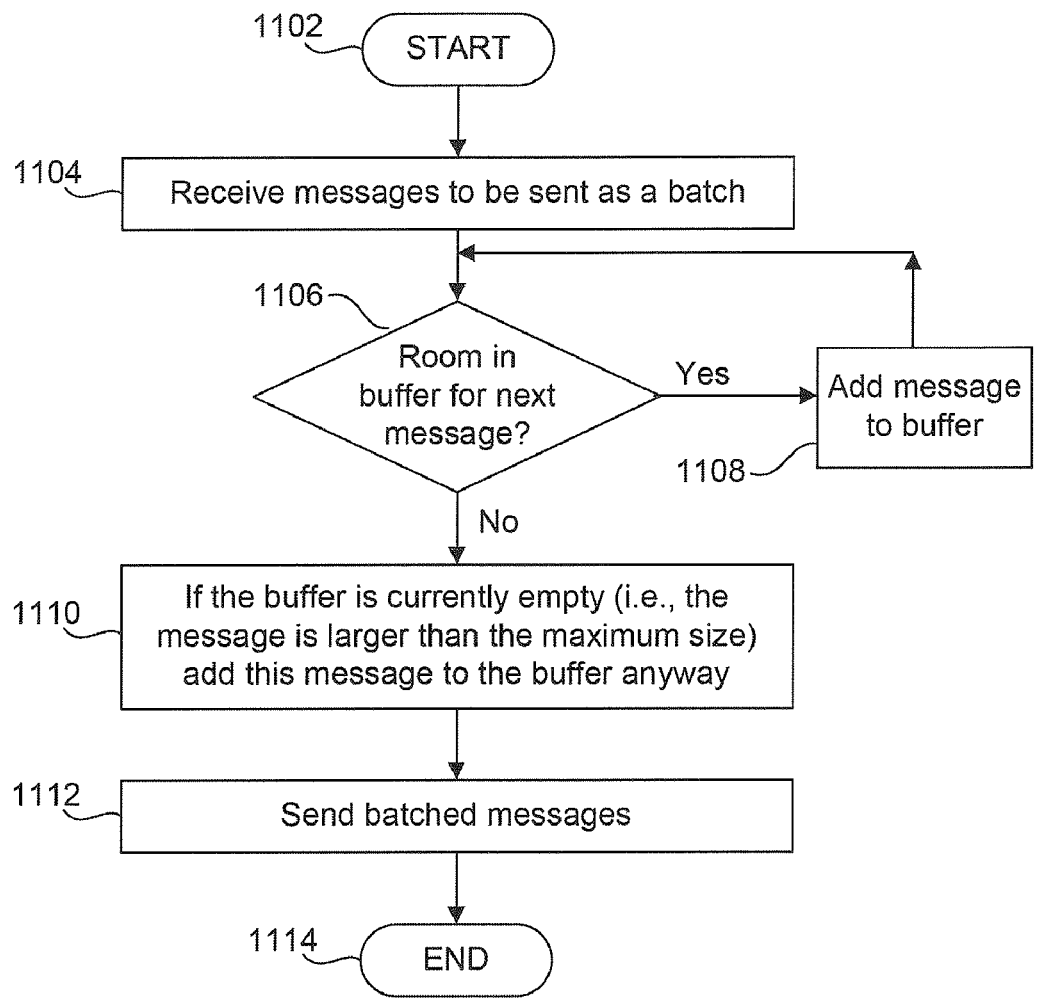
FIG. 11 is a flowchart illustrating steps by which import messages may be batched together, in accordance with an embodiment of the present invention.

A solution is to set a target maximum content size for import messages, in accordance with an embodiment of the present invention. FIG. 11 is a flowchart 1100 illustrating steps by which import messages may be batched together, in accordance with an embodiment of the present invention. One skilled in the relevant arts will appreciate that this technique can be applied to batching of any MBS messages, but is demonstrated with reference to import messages by way of example, and not limitation.

The method begins at step 1102 and proceeds to step 1104 where messages to be sent as a batch are received or otherwise identified or obtained. At step 1106, a determination is made as to whether there is additional room in a message buffer for the next message. If so, the next message is added to the buffer at step 1108. Otherwise, the message is not added to the buffer. However, at step 1110, a determination is made as to whether the buffer is still empty. This implies that the next message is larger than the target maximum content size. If so, this message is added to the buffer anyway, as the message must be sent one way or another. At step 1112, the batched messages from the buffer are sent, and the method ends at step 1114. The method repeats for each remaining message to be sent as a batch, as necessary.

An exemplary Java code for implementing this technique may be:

```
public void sendBatchedImports(String mbo, JsonArray rows)
{
    // Try to batch rows together up to MAXIMUM_CONTENT_SIZE
    int n = rows.size( );
    if (n == 0)
    {
        return;
    }
    String [ ] strings = new String [n];
    int totalSize = 1;
    for (int i = 0; i < n; i++)
    {
        JsonObject item = (JsonObject) rows.item(i);
        String itemString = item.toString( );
        int itemLength = itemString.length( );
        totalSize += 1 + itemLength;
        strings[i] = itemString;
    }
    StringBuilder sb = new StringBuilder (Math.min(totalSize,
        MAXIMUM_CONTENT_SIZE));
    for (int i = 0; i < n; i++)
    {
        String item = strings[i];
        int sbn = sb.length( );
        if (sbn > 0 && sbn + item.length( ) + 2 >
            MAXIMUM_CONTENT_SIZE)
        {
            sb.append(']');
            sendImportMessage (mbo, sb.toString( ));
            sb.setLength(0);
            sbn = 0;
        }
    }
    if (sb.length( ) > 0)
    {
        sb.append(']');
        sendImportMessage (mbo, sb.toString( ));
    }
}
```

VIII. Server Initiated Synchronization

As discussed above, replication based synchronization ("RBS") is possible through the use of cache tables and a download cursor, in accordance with an embodiment of the present invention. A client application 104 can send a synchronization request to synchronization server 110 in order to initiate a synchronization event, at which point the synchronization server sends the results of executing the download cursor to the client application 104.

Further described above is a novel technique of using notification queries to generate import messages for transmission from the synchronization server 110 to client application 104, allowing for changes impacting subscriptions to be regularly pushed to client application 104.

On the other hand, server initiated synchronization is a novel technique which incorporates elements of both RBS and MBS in order for the synchronization server 110, using techniques primarily derived from MBS, to inform client application 104 that it needs to request synchronization, using techniques primarily derived from RBS.

Figure 12:
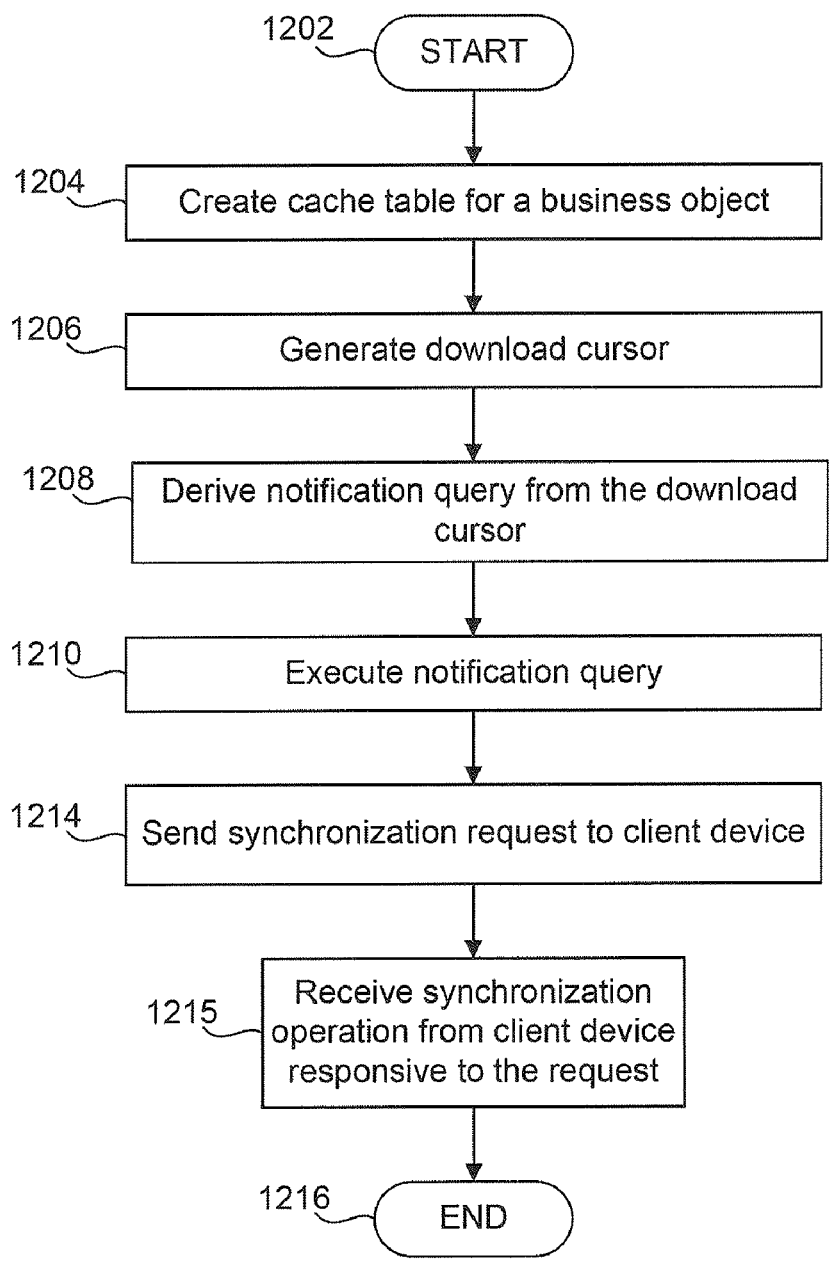
FIG. 12 is a flowchart illustrating steps by which server initiated synchronization is accomplished, in accordance with an embodiment of the present invention.

FIG. 12 is a flowchart 1200 illustrating steps by which server initiated synchronization is accomplished, in accordance with an embodiment of the present invention. The method begins at step 1202 and proceeds to step 1204 where a cache table is created, and to step 1206, where a download cursor is created, in accordance with an embodiment of the present invention. The creation of this cache table and download cursor is consistent with the methodologies employed for both RBS and MBS approaches, and are explained in detail above.

At step 1208, a notification query is derived per the techniques discussed with regard to MBS above. As also noted in the discussion of MBS techniques, steps 1204, 1206, and 1208 need not be executed at every synchronization event, as synchronization server 110 is able to persist the cache table, download cursor, and notification query as needed, in accordance with an embodiment of the present invention.

At step 1210, the notification query is executed, in accordance with an embodiment of the present invention. However, at step 1214, a synchronization request is sent to client application 104, rather than an import message, in accordance with a further embodiment of the present invention. This message conveys to client application 104 that it should perform a synchronization per RBS techniques. Accordingly, at step 1215, a synchronization operation is received from the client application 104, in accordance with an additional embodiment of the present invention. The method then ends at step 1216.

IX. Example Computer System Implementation

Figure 13:
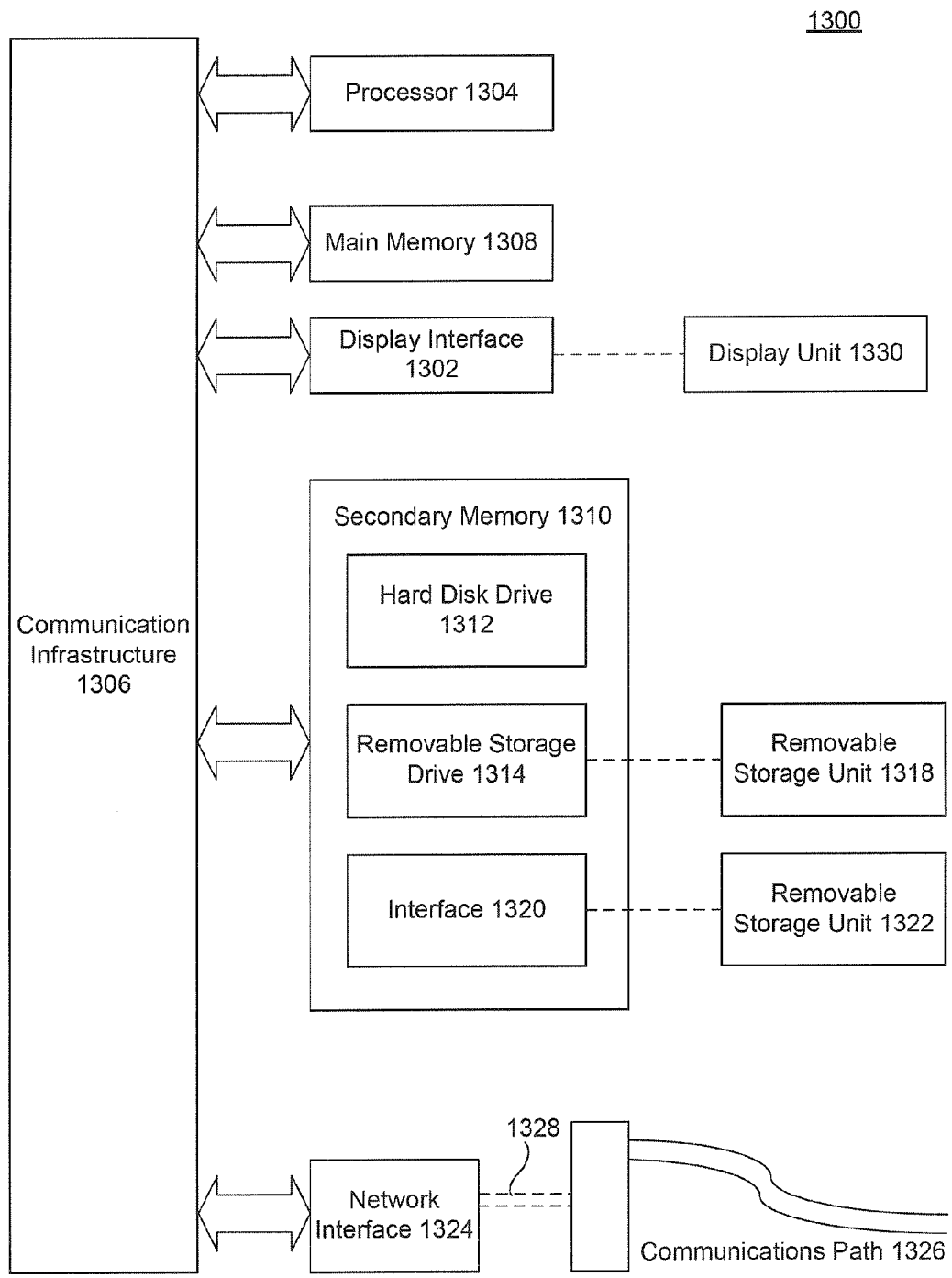
FIG. 13 depicts an example computer system in which embodiments of the present invention may be implemented.

Various aspects of the present invention can be implemented by software, firmware, hardware, or a combination thereof. FIG. 13 illustrates an example computer system 1300 in which the present invention, or portions thereof, can be implemented as computer-readable code. For example, the methods illustrated by flowcharts 200 of FIG. 2A, 250 of FIG. 2B, 300 of FIG. 3, 400 of FIG. 4, 500 of FIG. 5, 600 of FIG. 6, 700 of FIG. 7, 800 of FIG. 8. 900 of FIG. 9, 1000 of FIG. 10, 1100 of FIGS. 11, and 1200 of FIG. 12, can be implemented in system 1300. Various embodiments of the invention are described in terms of this example computer system 1300. After reading this description, it will become apparent to a person skilled in the relevant art how to implement the invention using other computer systems and/or computer architectures.

Computer system 1300 includes one or more processors, such as processor 1304. Processor 1304 can be a special purpose or a general purpose processor. Processor 1304 is connected to a communication infrastructure 1306 (for example, a bus or network).

Computer system 1300 also includes a main memory 1308, preferably random access memory (RAM), and may also include a secondary memory 1310. Secondary memory 1310 may include, for example, a hard disk drive 1312, a removable storage drive 1314, and/or a memory stick. Removable storage drive 1314 may comprise a floppy disk drive, a magnetic tape drive, an optical disk drive, a flash memory, or the like. The removable storage drive 1314 reads from and/or writes to a removable storage unit 1318 in a well known manner. Removable storage unit 1318 may comprise a floppy disk, magnetic tape, optical disk, etc. that is read by and written to by removable storage drive 1314. As will be appreciated by persons skilled in the relevant art(s), removable storage unit 1318 includes a computer usable storage medium having stored therein computer software and/or data.

In alternative implementations, secondary memory 1310 may include other similar means for allowing computer programs or other instructions to be loaded into computer system 1300. Such means may include, for example, a removable storage unit 1322 and an interface 1320. Examples of such means may include a program cartridge and cartridge interface (such as that found in video game devices), a removable memory chip (such as an EPROM, or PROM) and associated socket, and other removable storage units 1322 and interfaces 1320 that allow software and data to be transferred from the removable storage unit 1322 to computer system 1300.

Computer system 1300 may also include a communications interface 1324. Communications interface 1324 allows software and data to be transferred between computer system 1300 and external devices. Communications interface 1324 may include a modem, a network interface (such as an Ethernet card), a communications port, a PCMCIA slot and card, or the like. Software and data transferred via communications interface 1324 are in the form of signals that may be electronic, electromagnetic, optical, or other signals capable of being received by communications interface 1324. These signals are provided to communications interface 1324 via a communications path 1326. Communications path 1326 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 1318, removable storage unit 1322, and a hard disk installed in hard disk drive 1312. Signals carried over communications path 1326 can also embody the logic described herein. Computer program medium and computer usable medium can also refer to memories, such as main memory 1308 and secondary memory 1310, which can be memory semiconductors (e.g. DRAMs, etc.). These computer program products are means for providing software to computer system 1300.

Computer programs (also called computer control logic) are stored in main memory 1308 and/or secondary memory 1310. Computer programs may also be received via communications interface 1324. Such computer programs, when executed, enable computer system 1300 to implement the present invention as discussed herein. In particular, the computer programs, when executed, enable processor 1304 to implement the processes of the present invention, such as the steps in the methods illustrated by flowcharts 200 of FIG. 2A, 250 of FIG. 2B, 300 of FIG. 3, 400 of FIG. 4, 500 of FIG. 5, 600 of FIG. 6, 700 of FIG. 7, 800 of FIG. 8. 900 of FIG. 9, 1000 of FIG. 10, 1100 of FIGS. 11, and 1200 of FIG. 12, discussed above. Accordingly, such computer programs represent controllers of the computer system 1300. Where the invention is implemented using software, the software may be stored in a computer program product and loaded into computer system 1300 using removable storage drive 1314, interface 1320, hard drive 1312 or communications interface 1324.

The invention is also directed to computer program products comprising software stored on any computer useable medium. Such software, when executed in one or more data processing device, causes a data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

X. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A method comprising:
    invoking an operation to change a current data row from a table in a local database;
    inserting a pending change data row in the table, the pending change data row comprising a changed attribute, wherein the pending change data row and current data row are distinguished by a primary key comprising a key value which is common to the pending change data row and the current data row and a pending change indicator; and
    submitting data from the pending change data row.

2. The method of claim 1, wherein data from the table corresponds to a business object.

3. The method of claim 1, wherein the operation is a create operation, the method further comprising:
    determining whether a corresponding pending change data row already exists, and, if so, updating the pending change data row using data from the create operation; and
    identifying the pending change data row as a create operation.

4. The method of claim 1, wherein the operation is an update operation, the method further comprising:
    inserting a copy of data from the current data row into an original state table; and
    identifying the pending change data row as an update operation.

5. The method of claim 1, wherein the operation is a delete operation, the method further comprising:
    inserting a copy of data from the current data row into an original state table; and
    identifying the pending change data row as an update operation.

6. The method of claim 1, further comprising:
    inserting a copy of data from the current data row into an original state table if the operation is an update or delete operation; and
    setting a replay counter within the pending change data row to a unique identifier.

7. The method of claim 6, further comprising:
    receiving notification of a replay operation; and
    determining whether the replay operation was successful.

8. The method of claim 7, wherein the replay operation was successful, the method further comprising:
    deleting the pending change data row corresponding to the replay operation based on correlation between a message identifier and the replay counter; and
    deleting a corresponding original state from the original state table if created.

9. The method of claim 7, wherein the replay operation was unsuccessful, the method further comprising:
    updating the pending change data row with a message identifier to indicate failure.

10. The method of claim 6, wherein submitting data from the pending change data row comprises:
    specifying a client identifier corresponding to the local database;
    specifying a message identifier corresponding to the replay counter; and
    sending a message based synchronization request to a synchronization server, the request comprising the client identifier and the message identifier.

11. The method of claim 1, further comprising:
    rewriting an existing named query to prevent returning both the pending change data row and the current data row in a result.

12. The method of claim 11, wherein rewriting the existing named query further comprises:
    modifying the existing named query to return pending changes including the pending change data row where pending changes exist, or current data where pending changes do not exist.

13. The method of claim 1, further comprising:
    generating a dynamic query to prevent returning both the pending change data row and the current data row in a result.

14. The method of claim 13, wherein generating the dynamic query further comprises:
    designing the dynamic query to return pending changes including the pending change data row where pending changes exist, or current data where pending changes do not exist.

15. A computer-readable medium having computer-executable instructions stored thereon that, if executed by a computing device, cause the computing device to perform a method comprising:
    invoking an operation to change a current data row from a table in a local database;
    inserting a pending change data row in the table, the pending change data row comprising a changed attribute, wherein the pending change data row and current data row are distinguished by a primary key comprising a key value which is common to the pending change data row and the current data row and a pending change indicator; and
    submitting data from the pending change data row.

16. The computer-readable medium of claim 15, wherein data from the table corresponds to a business object.

17. The computer-readable medium of claim 15, wherein the operation is a create operation, the method further comprising:
  determining whether a corresponding pending change data row already exists, and, if so, updating the pending change data row using data from the create operation; and
  identifying the pending change data row as a create operation.

18. The computer-readable medium of claim 15, wherein the operation is an update operation, the method further comprising:
  inserting a copy of data from the current data row into an original state table; and
  identifying the pending change data row as an update operation.

19. The computer-readable medium of claim 15, wherein the operation is a delete operation, the method further comprising:
  inserting a copy of data from the current data row into an original state table; and
  identifying the pending change data row as an update operation.

20. The computer-readable medium of claim 15, the method further comprising:
  inserting a copy of data from the current data row into an original state table if the operation is an update or delete operation; and
  setting a replay counter within the pending change data row to a unique identifier.

21. The computer-readable medium of claim 20, the method further comprising:
  receiving notification of a replay operation; and
  determining whether the replay operation was successful.

22. The computer-readable medium of claim 21, wherein the replay operation was successful, the method further comprising:
  deleting the pending change data row corresponding to the replay operation based on correlation between a message identifier and the replay counter; and
  deleting a corresponding original state from the original state table if created.

23. The computer-readable medium of claim 21, wherein the replay operation was unsuccessful, the method further comprising:
  updating the pending change data row with a message identifier to indicate failure.

24. The computer-readable medium of claim 20, wherein submitting data from the pending change data row comprises:
  specifying a client identifier corresponding to the local database;
  specifying a message identifier corresponding to the replay counter; and
  sending a message based synchronization request to a synchronization server, the request comprising the client identifier and the message identifier.

25. The computer-readable medium of claim 15, the method further comprising:
  rewriting an existing named query to prevent returning both the pending change data row and the current data row in a result.

26. The computer-readable medium of claim 25, wherein rewriting the existing named query further comprises:
  modifying the existing named query to return pending changes including the pending change data row where pending changes exist, or current data where pending changes do not exist.

27. The computer-readable medium of claim 15, the method further comprising:
  generating a dynamic query to prevent returning both the pending change data row and the current data row in a result.

28. The computer-readable medium of claim 27, wherein generating the dynamic query further comprises:
  designing the dynamic query to return pending changes including the pending change data row where pending changes exist, or current data where pending changes do not exist.

29. A system comprising:
  a memory configured to store modules comprising:
    an invoking module configured to invoke an operation to change a current data row from a table in a local database,
    an inserting module configured to insert a pending change data row in the table, the pending change data row comprising a changed attribute, wherein the pending change data row and current data row are distinguished by a primary key comprising a key value which is common to the pending change data row and the current data row and a pending change indicator, and
    a submitting module configured to submit data from the pending change data row; and
  one or more processors configured to process the modules.

* * * * *